US012801347B2

(12) United States Patent
Ghodrati et al.

(10) Patent No.: US 12,801,347 B2
(45) Date of Patent: Nov. 17, 2026

(54) MIXED-SIGNAL ACCELERATION OF DEEP NEURAL NETWORKS

(71) Applicant: The Regents of the University of California, Oakland, CA (US)

(72) Inventors: Soroush Ghodrati, La Jolla, CA (US); Hadi Esmaeilzadeh, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1259 days.

(21) Appl. No.: 17/596,734

(22) PCT Filed: Jun. 18, 2020

(86) PCT No.: PCT/US2020/038551
§ 371 (c)(1),
(2) Date: Dec. 16, 2021

(87) PCT Pub. No.: WO2020/257531
PCT Pub. Date: Dec. 24, 2020

(65) Prior Publication Data

US 2022/0350662 A1 Nov. 3, 2022

Related U.S. Application Data

(60) Provisional application No. 62/863,148, filed on Jun. 18, 2019.

(51) Int. Cl.
*G06F 7/544* (2006.01)
*G06G 7/16* (2006.01)

(52) U.S. Cl.
CPC ............ *G06F 7/5443* (2013.01); *G06G 7/16* (2013.01)

(58) Field of Classification Search
CPC ......... G06F 7/5443; G06G 7/16; G06N 3/065
See application file for complete search history.

(56) References Cited

U.S. PATENT DOCUMENTS

| | | | | |
|---|---|---|---|---|
| 2018/0373902 | A1* | 12/2018 | Muralimanohar | G11C 13/00 |
| 2020/0081711 | A1* | 3/2020 | Bayat | G11C 11/54 |
| 2020/0401206 | A1* | 12/2020 | Kallam | G06F 7/5443 |

OTHER PUBLICATIONS

E. H. Lee and S. S. Wong, "Analysis and Design of a Passive Switched-Capacitor Matrix Multiplier for Approximate Computing, " in IEEE Journal of Solid-State Circuits, vol. 52, No. 1, pp. 261-271, Jan. 2017, doi: 10.1109/JSSC.2016.2599536 (Year: 2017).*

(Continued)

*Primary Examiner* — Carlo Waje
(74) *Attorney, Agent, or Firm* — Ashurst Perkins Coie US LLP

(57) ABSTRACT

Disclosed are devices, systems and methods for accelerating vector-based computation. In one example aspect, an accelerator apparatus includes a plurality of mixed-signal units, each of which includes a first digital-to-analog convertor configured to convert a subset of digital-domain bits to a first analog-domain signal and a second digital-to-analog convertor configured to convert a subset of digital-domain bits to a second analog-domain signal. Each mixed-signal unit also includes a capacitor coupled to the digital-to-analog convertors to accumulate a result of a multiplication operation as an analog signal. The apparatus includes a circuitry coupled to the mixed-signal units to shift part of the analog signals of the plurality of mixed-signal units. The circuitry comprises an additional capacitor to store an analog-domain result for a multiply-accumulate operation. The apparatus also includes an analog-to-digital converter coupled to the circuitry to convert the analog-domain result into a digital-domain result.

10 Claims, 21 Drawing Sheets

(56) References Cited

OTHER PUBLICATIONS

K. Ueyoshi et al., "QUEST: Multi-Purpose Log-Quantized DNN Inference Engine Stacked on 96-MB 3-D Sram Using Inductive Coupling Technology in 40-nm CMOS, " in IEEE Journal of Solid-State Circuits, vol. 54, No. 1, pp. 186-196, Jan. 2019, doi: 10.1109/JSSC.2018.2871623 (Year: 2019).*
Gao et al., "TETRIS: Scalable and Efficient Neural Network Acceleration with 3D Memory", ASPLOS '17: Proceedings of the Twenty-Second International Conference on Architectural Support for Programming Languages and Operating Systems, pp. 751-764, https://doi.org/10.1145/3037697.3037702 (Year: 2017).*
Abadi, M. et al., "TensorFlow: Large-scale machine learning on heterogeneous distributed systems", arXiv:1603.04467v2 [cs.DC], 2016, 19 pages.
Aklaghi, V. et al., "Snapea: Predictive early activation for reducing computation in deep convolutional neural networks", In *ISCA*, 2018, 12 pages.
Albericio, J. et al., "Cnvlutin: ineffectual-neuron-free deep neural network computing", In *ISCA*, 2016, 13 pages.
Andri, R. et al., "YodaNN: An Ultra-Low Power Convolutional Neural Network Accelerator Based on Binary Weights", *2016 IEEE Computer Society Annual Symposium on VLSI*, 2016, 6 pages.
Bankman, D. et al., An 8-bit, 16 input, 3.2 pj/op switched-capacitor dot product circuit in 28-nm fdsoi cmos. In Solid-State Circuits Conference (A-SSCC), 2016 IEEE Asian, pp. 21-24. IEEE, 2016, 4 pages.
Bankman, D. et al., "An Always-On 3.8 μj/86% CIFAR-10 Mixed-Signal Binary CNN Processor With All Memory on Chip in 28nm CMOS", In *Solid-State Circuits Conference-(ISSCC), 2018 IEEE International*, 2018, 15 pages.
Bankman, D. et al., "Passive charge redistribution digital-to-analogue multiplier", *Electronics Letters*, 51(5):386-388, 2015, 2 pages.
Brodersen, R. et al., "Mos switched-capacitor filters", *Proceedings of the IEEE*, 67(1):61-75, 1979, 21 pages.
Buhler, F. et al., A 3.43TOPS/W 48.9 pJ/Pixel 50.1nJ/Classification 512 Analog Neuron Sparse Coding Neural Network with On-Chip Learning and Classification In 40nm CMOS, In *VLSI Circuits*, 2017 Symposium on, pp. C30-C31, IEEE, 2017, 2 pages.
Chen, L. et al., "Accelerator-friendly neural-network training: learning variations and defects in rram crossbar", In *Proceedings of the Conference on Design, Automation & Test in Europe*, pp. 19-24, European Design and Automation Association, 2017, 6 pages.
Chen, T. et al., "DianNao: A Small-Footprint High-Throughput Accelerator for Ubiquitous Machine-Learning", In *ASPLOS*, 2014, 15 pages.
Chen, Y. et al., "DaDianNao: A Machine-Learning Supercomputer", *2014 47th Annual IEEE/ACM International Symposium on Microarchitecture*, 14 pages.
Chen, Y.-H. et al., "Eyeriss: A Spatial Architecture For Energy-Efficient Dataflow For Convolutional Neural Networks", *2016 ACM/IEEE 43rd Annual International Symposium on Computer Architecture*, 13 pages.
Chen, Y.-H. et al., "Eyeriss: An Energy-Efficient Reconfigurable Accelerator for Deep Convolutional Neural Networks", *IEEE Journal of Solid-State Circuits*, vol. 52, No. 1, Jan. 2017, 12 pages.
Chi, P. et al., "Prime: A Novel Processing-In-Memory Architecture for Neural Network Computation in Reram-Based Main Memory", In *ACM SIGARCH Computer Architecture News*, vol. 44, pp. 27-39, IEEE Press, 2016, 13 pages.
Chung, E. et al., "Accelerating persistent neural networks at datacenter scale", In *HotChips*, 2017, 9 pages.
Crols, J. et al., "Switched-Opamp: An Approach to Realize Full Cmos Switched-Capacitor Circuits at Very Low Power Supply Voltages", *IEEE Journal of Solid-State Circuits*, 29(8):936-942, 1994, 7 pages.
Delmas, A. et al., "Tartan: Accelerating Fully-Connected And Convolutional Layers in Deep Learning Networks by Exploiting Numerical Precision Variability", *arXiv:1707.09068v1* [*cs.NE*], Jul. 27, 2017, 12 pages.
Deng, J. et al., "ImageNet: A Large-Scale Hierarchical Image Database", In *CVPR*, 2009, 8 pages.
Esmaeilzadeh, H. et al., "Neural Acceleration for General-Purpose Approximate Programs", *2012 IEEE/ACM 45th Annual International Symposium on Microarchitecture*, 12 pages.
Esmaeilzadeh, H. et la., "Dark Silicon and the End of Multicore Scaling", In *ISCA, 2011*, 13 pages.
Facebook AI Research, Caffe2, https://caffe2.ai/, retrieved Mar. 20, 2026, 3 pages.
Fiorenza, J. et al., "Comparator-Based Switched-Capacitor Circuits for Scaled CMOS Technologies", *IEEE Journal of Solid-State Circuits*, 41(12):2658-2668, 2006, 11 pages.
Grabec, I. et al., "Development of a Sensory-Neural Network for Medical Diagnosing", *ArXiv e-prints*, Jul. 2018, 8 pages.
Gray, P. et al., *Analysis And Design Of Analog Integrated Circuits*, Wiley, 2001, 897 pages.
Han, S. et al., "EIE: Efficient Inference Engine on Compressed Deep Neural Network", 2016 ACM/IEEE 43rd Annual International Symposium on Computer Architecture, 12 pages.
Hardavellas, N. et al., "Toward Dark Silicon in Servers", IEEE Micro, 31(4):6-15, Jul.-Aug. 2011, 10 pages.
Harpe, P., "A 0.0013 mm2 10b 10MS/s SAR ADC with a 0.0048 mm2 42dB-Rejection Passive FIR Filter", In 2018 IEEE Custom Integrated Circuits Conference, CICC 2018, Institute of Electrical and Electronics Engineers Inc, 2018, 4 pages.
He, K. et al., "Deep Residual Learning for Image Recognition", In *CVPR*, 2016, 9 pages.
Hegde, K. et al., "UCNN: Exploiting Computational Reuse in Deep Neural Networks Via Weight Repetition", 2018 *ACM/IEEE 45th Annual International Symposium on Computer Architecture*, 14 pages.
Hochreiter, S. et al., "Long Short-Term Memory", *Neural Computation* 9(8):1735-1780, 1997, 32 pages.
Hubara, I. et al., "Quantized Neural Networks: Training Neural Networks with Low Precision Weights and Activations", *Journal of Machine Learning Research 18* (2018) 1-30, submitted 2016, 30 pages.
Hybrid Memory Cube Consortium, *Hybrid Memory Cube Specification* 1.0, 2013, 122 pages.
Jeddeloh, J. et al., "Hybrid Memory Cube New DRAM Architecture Increases Density and Performance", *2012 Symposium on VLSI Technology Digest of Trechnical Papers*, pp. 87-88, IEEE, 2012, 2 pages.
Ji, H. et al., "ReCom: An Efficient Resistive Accelerator for Compressed Deep Neural Networks", In *Design, Automation & Test in Europe Conference & Exhibition (DATE)*, 2018, pp. 237-240, IEEE, 2018, 4 pages.
Jouppi, N. P. et al., "In-Datacenter Performance Analysis of a Tensor Processing Unit", ISCA '17, Jun. 24-28, 2017, Toronto, ON, Canadal, 13 pages.
Judd, P. et al., "Stripes: Bit-Serial Deep Neural Network Computing", In *MICRO*, 2016, IEEE, 12 pages.
Kim, D. et al., "Neurocube: A Programmable Digital Neuromorphic Architecture with High-Density 3D Memory", In *Computer Architecture (ISCA), 2016 ACM/IEEE 43rd Annual International Symposium* on, pp. 380-392. IEEE, 2016, 13 pages.
Krizhevsky, A., "Learning Multiple Layers of Features from Tiny Images", *Computer Science Department, University of Toronto*, Tech. Rep, 2009, 60 pages.
Krizhevsky, A., "One Weird Trick for Parallelizing Convolutional Neural Networks", *arXiv:1404.5997v2* [*cs.NE*], Apr. 26, 2014, 7 pages.
Lecun, Y. et al., "Gradient-Based Learning Applied to Document Recognition", *Proceedings of the IEEE*, 86(11):2278-2324, 1998, 47 pages.
Lee, J. et al., "UNPU: A 50.6 TOPS/W Unified Deep Neural Network Accelerator With 1b-to-16b Fully-Variable Weight Bit-Precision", *ISSCC 2018 / Session 13 / Machine Learning and Signal Processing*/ 13.3, 3 pages.

(56) References Cited

OTHER PUBLICATIONS

Li, B. et al., "ReRAM-based Accelerator for Deep Learning", In Design, *Automation & Test in Europe Conference & Exhibition (DATE)*, 2018, pp. 815-820, IEEE, 2018, 6 pages.
Li, B. et al., "Training Itself: Mixed-signal Training Acceleration for Memristor-based Neural Network", In *Design Automation Conference (ASP-DAC), 2014 19th Asia and South Pacific*, pp. 361-366, IEEE, 2014, 6 pages.
Li, F. et al., "Ternary Weight Networks", *arXiv:1605.04711v3* [*cs.CV*], Nov. 20, 2016, 5 pages.
Li, R. et al., "Using deep Residual Network to search for galaxy-Ly a emitter lens candidates based on spectroscopic-selection", *Monthly Noitices of the Royal Astronomical Society 482*, pp. 313-320, 2018, 8 pages.
Li, S. et al., "CACTI-P: Architecture-level Modeling for SRAM-based Structures with Advanced Leakage Reduction Techniques", In *ICCAD*, 2011 IEEE, 8 pages.
Li, Y. et al., "Caterpillar: Coarse Grain Reconfigurable Architecture for Accelerating the Training of Deep Neural Networks", In *Application-specific Systems, Architectures and Processors (ASAP), 2017 IEEE 28th International Conference on*, pp. 1-10, IEEE, 2017, 10 pages.
LiKamWa, R. et al., "RedEye: Analog ConvNet Image Sensor Architecture for Continuous Mobile Vision", In *ACM Sigarch Computer Architecture News*, vol. 44, pp. 255-266, IEEE Press, 2016, 12 pages.
Long, Y. et al., "ReRAM-Based Processing-in-Memory Architecture for Recurrent Neural Network Acceleration", *IEEE Transactions on Very Large Scale Integration (VLSI) Systems*, (99):1-14, 2018, 14 pages.
Mahajan, D. et al., "Tabla: A Unified Template-based Framework for Accelerating Statistical Machine Learning", In *HPCA*, 2016 IEEE, 13 pages.
Marcus, M. et al., "Building a Large Annotated Corpus of English: The Penn Treebank", *Association for Computational Linguistics*, 1993, 18 pages.
Marinella, M. et al., "Multiscale Co-Design Analysis of Energy, Latency, Area, and Accuracy of a ReRAM Analog Neural Training Accelerator", *IEEE Journal on Emerging and Selected Topics in Circuits and Systems*, 8(1):86-101, 2018, 16 pages.
Mishra, A. et al., "WRPN: Wide Reduced-Precision Networks", *arXiv:1709.01134v1* [*cs.CV*], Sep. 4, 2017, 11 pages.
Miyashita, D. et al., "A Neuromorphic Chip Optimized for Deep Learning and CMOS Technology With Time-Domain Analog and Digital Mixed-Signal Processing", *IEEE Journal of Solid-State Circuits*, 52(10):2679-2689, 2017, 11 pages.
Mo, J. et al., "SafeDrive: Enhancing Lane Appearance for Autonomous and Assisted Driving Under Limited Visibility", *ArXiv:1807.11575v1* [*cs.CV*], Jul. 24, 2018, 8 pages.
NCSU, FreePDK45™, 2018, retrieved online Mar. 20, 2026, 11 pages.
Netzer, Y. et al., "Reading Digits in Natural Images with Unsupervised Feature Learning", In *NIPS Workshop on Deep Learning and Unsupervised Feature Learning*, 2011, 9 pages.
Niehues, J. et al., "Low-Latency Neural Speech Translation", *ArXiv:1808.00491v1* [*cs.CL*], Aug. 1, 2018, 5 pages.
Nvidia TensorRT 4.0, https://developer.nvidia.com/tensort, retrieved online Mar. 20, 2026, 17 pages.
Parashar, A. et al., "SCNN: An Accelerator for Compressed-sparse Convolutional Neural Networks", In *ISCA*, 2017, 14 pages.
Qiao, X. et al., "AtomLayer: A Universal ReRAM-Based CNN Accelerator with Atomic Layer Computation", In *Proceedings of the 55th Annual Design Automation Conference*, ACM, 2018, 7 pages.
Rohde, D. et al., "RecoGym: A Reinforcement Learning Environment for the problem of Product Recommendation in Online Advertising", *RecSys'18*, Oct. 2018, 5 pages.
Shafiee, A. et al., "Isaac: A Convolutional Neural Network Accelerator with In-Situ Analog Arithmetic in Crossbars", In *ISCA*, 2016 IEEE, 13 pages.
Sharify, S. et al., "Loom: Exploiting Weight and Activation Precisions to Accelerate Convolutional Neural Networks", *DAC '18*, Jun. 24-29, 2018, San Francisco, CA, USA, 7 pages.
Sharma, H. et al., "Bit Fusion: Bit-Level Dynamically Composable Architecture for Accelerating Deep Neural Networks", *2018 ACM/IEEE 45th Annual International Symposium on Computer Architecture*, pp. 764-775, 2018 IEEE, 12 pages.
Sharma, H. et al., "From High-Level Deep Neural Models to FPGAs", In *MICRO*, 2016 IEEE, 12 pages.
Simonyan, K. et al., "Very Deep Convolutional Networks for Large-Scale Image Recognition", *arXiv:1409.1556v6* [*cs.CV*], Apr. 10, 2014, 14 pages.
Song, L. et al., "PipeLayer: A Pipelined ReRAM-Based Accelerator for Deep Learning", In *High Performance Computer Architecture (HPCA), 2017 IEEE International Symposium on, pp. 541-552, IEEE*, 2017, 12 pages.
Srivastava, P. et al., "Promise: An End-To-End Design of a Programmable Mixed-Signal Accelerator for Machine-Learning Algorithms", *In 2018 ACM/IEEE 45th Annual International Symposium on Computer Architecture (ISCA), IEEE, 2018*, 14 pages.
St. Amant, R. et al., "General-Purpose Code Acceleration With Limited-Precision Analog Computation", In *ISCA*, pp. 505-516, 2014 IEEE, 12 pages.
Tsividis, YP et al., "Switched-Capacitor Neural Networks", *Electronics Letters*, 23(18):958-959, 1987, 2 pages.
Upadhyay, H. et al., "A High Speed and Low Power 8 Bit X 8 Bit Multiplier Design using Novel Two Transistor (2t) XOR Gates", *Journal of Low Power Electronics*, Jan. 2015, 34 pages.
Venkatesh, G. et al., "Conservation Cores: Reducing the Energy of Mature Computations", *In ASPLOS '10*, pp. 205-218, Mar. 13-17, 2010, 14 pages.
Zhang, C. et al., "Optimizing FPGA-Based Accelerator Design for Deep Convolutional Neural Networks", *In FPGA '15*, Feb. 22-24, 2015, 11 pages.
Zhang, D. et al., "LQ-Nets: Learned Quantization for Highly Accurate and Compact Deep Neural Networks", *ECCV 2018 LNCS*, 18 pages.
Zhang, J. et al., "A Matrix-Multiplying ADC Implementing a Machine-Learning Classifier Directly with Data Conversion", *ISSCC 2015 / Session 18 / SoCs For Mobile Vision, Sensing, and Communications / 18.4*, IEEE 2015, 3 pages.
Zhang, S. et al., "Cambricon-X: An Accelerator for Sparse Neural Networks", In *MICRO*, 2016 IEEE, 12 pages.
Zhou, S. et al., "DoReFa-Net: Training Low Bitwidth Convolutional Neural Networks with Low Bitwidth Gradients", *arXiv:1606.06160v3* [*cs.NE*], Feb. 2, 2018, 13 pages.

* cited by examiner

MIXED-SIGNAL ACCELERATION OF DEEP NEURAL NETWORKS

CROSS REFERENCE TO RELATED APPLICATIONS

This document is a U.S.C. § 371 National Stage application of International Application No. PCT/US2020/038551, entitled "MIXED-SIGNAL ACCELERATION OF DEEP NEURAL NETWORKS" filed on Jun. 18, 2020 which further claims priority to and benefits of U.S. Provisional Application No. 62/863,148, titled "MIXED-SIGNAL ACCELERATION OF DEEP NEURAL NETWORKS," filed on Jun. 18, 2019, the entire disclosures of the aforementioned applications are incorporated by reference as part of the disclosure of this application.

STATEMENT REGARDING FEDERALLY SPONSORED RESEARCH OR DEVELOPMENT

This invention was made with government support under grant RJ321-G1 (FA9550-17-1-0274 awarded by the Air Force Office of Scientific Research, CNS1833373 and ECCS1609823 awarded by the National Science Foundation (NSF). The government has certain rights in the invention.

TECHNICAL FIELD

This patent document relates to an accelerator architecture applicable to neural networks.

BACKGROUND

Deep Neural Networks (DNNs) are revolutionizing a wide range of services and applications such as language translation, transportation, intelligent search, e-commerce, and medical diagnosis. These benefits are predicated upon delivery of the required performance and energy efficiency from hardware platforms.

SUMMARY

Methods, devices, and systems are disclosed herein to enable rearchitecting of vector dot-product as a series of wide, interleaved and bit-partitioned arithmetic operations. The disclosed techniques, among other features and benefits, allow significant reduction of analog-to-digital conversion overhead by rearranging the bit-level operations across the elements of the vector dot-product.

In one example aspect, an accelerator apparatus comprises a plurality of mixed-signal units. Each of the plurality of mixed-signal units comprises a first digital-to-analog convertor configured to convert a subset of digital-domain bits partitioned from a first input vector to a first analog-domain signal and a second digital-to-analog convertor configured to convert a subset of digital-domain bits partitioned from a second input vector to a second analog-domain signal. The second digital-to-analog convertor is coupled to the first digital-to-analog convertor to enable a multiplication operation on the first analog-domain signal and the second analog-domain signal. The apparatus includes a capacitor coupled to the first digital-to-analog convertor and the second digital-to-analog convertor configured to accumulate a result of the multiplication operation as an analog signal. The apparatus also includes a circuitry coupled to the plurality of mixed-signal units to shift at least part of the analog signals of the plurality of mixed-signal units according to one or more control signals. The circuitry comprises an additional capacitor to store an analog-domain result for a multiply-accumulate operation of the first input vector and the second input vector based on accumulating results from the plurality of mixed-signal units. The apparatus also includes an analog-to-digital converter coupled to the circuitry to convert the analog-domain result into a digital-domain result.

In another example aspect, a method for performing computation on an accelerator apparatus includes partitioning two input vectors for a multiply-accumulate operation into multiple segments of bits in a digital domain and rearranging the segments in an interleaved manner based on an associative property of the multiply-accumulate operation. Each rearranged segment comprising a first subset of bits and a second subset of bits. The method also includes converting, for each re-arranged segment, the first subset of bits and the second subset of bits to two analog-domain signals, multiplying and accumulating the analog-domain signals to obtain an analog-domain result, and converting the analog-domain result into a digital-domain result of the multiply-accumulate operation for the two input vectors.

In yet another aspect, a non-transitory computer readable medium having code stored thereon that is executable by a processor is disclosed. The code, when executed by a processor, causes the processor to receive a set of instructions to perform one or more multiply-accumulate operations on an apparatus that comprises a plurality of accelerator cores and a memory substrate. The plurality of accelerator cores is in a stacked configuration to form a three-dimensional (3D) array of computation units that is grouped into multiple clusters. The memory substrate is also in a stacked configuration to form a 3D array of memory units. Each memory unit is configured to provide on-chip data access to a corresponding accelerator core. The processor is configured to perform a pre-processing operation that comprises dividing the set of program code and the set of data based on a structural description of the apparatus. The structural description includes information about a manner in which the 3D array of computation units and the 3D array of memory units are structured. The processor is also configured to generate instruction blocks based on a result of the pre-processing operation.

DETAILED DESCRIPTION

Figure 1A:
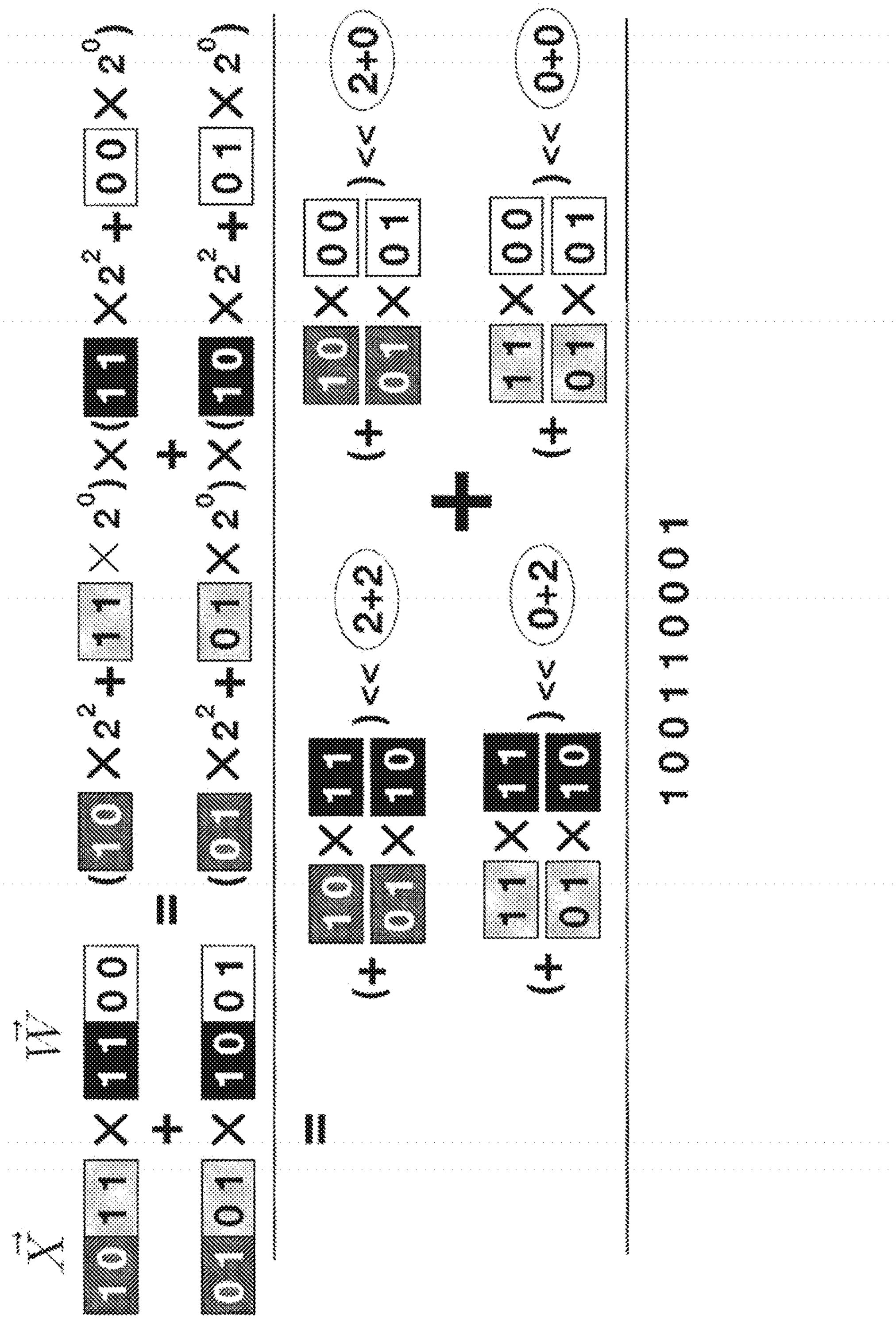
FIG. 1A illustrates an example of bit-partitioning multiply-accumulation in accordance with one or more embodiments of the present technology.

It is noted that the following section headings are used in the present document only to improve readability and do not limit scope of the disclosed embodiments and techniques in each section to only that section. Certain features are described using the example of DNN systems. However, applicability of the disclosed techniques is not limited to only DNN systems and can be extended to other neural network systems.

Deep learning is part of a broader family of machine learning methods based on artificial neural networks. A deep neural network (DNN) is an artificial neural network (ANN) with multiple layers between the input and output layers. DNNs are applicable to a wide range of services and applications such as language translation, transportation, intelligent search, e-commerce, and medical diagnosis. These benefits are predicated upon delivery on performance and energy efficiency from hardware platforms. With the diminishing benefits from general-purpose processors, there is an explosion of digital accelerators for DNNs.

Low-power capability of mixed-signal design has the potential to accelerate DNNs. However, mixed-signal circuitry suffers from a limited range for information encoding, susceptibility to noise, and Analog to Digital (A/D) conversion overhead. The disclosed techniques address these challenges by leveraging a vector-based dot-product (the basic operation in DNNs) that is bit-partitioned into groups of spatially parallel low-bitwidth operations and interleaved across multiple elements of the vectors. As such, the building blocks of the accelerator become a group of wide, yet low-bitwidth multiply-accumulate units that operate in the analog domain and share a single A/D converter. The low-bitwidth analog operation tackles the encoding range limitation and facilitates noise mitigation. Moreover, the switched-capacitor design paradigm is used for bit-level reformulation of DNN operations. A switched-capacitor circuitry can be used to perform the group multiplications in the charge domain and accumulates the results of the group in its capacitors over multiple cycles. The accumulating capacitors combined with wide bit-partitioned operations alleviates the need for A/D conversion per operation.

Across a wide range of DNN models, the large majority of DNN operations belong to convolution and fully-connected layers. Table 1 shows percentage of operations in different layers of various DNN models. Normally, the convolution and fully-connected layers are broken down into a series of vector dot-products that generate a scalar and comprise a set of Multiply-Accumulate (MACC) operations. Certain digital and mixed-signal accelerators use a large array of stand-alone MACC units to perform the necessary computations. When moving to the mixed-signal domain, this stand-alone arrangement of MACC operations imposes significant overhead in the form of Analog-to-Digital (A/D) and Digital-to-Analog (D/A) conversions for each operation due to the high cost of converting the operands and outputs of each MACC to and from the analog domain, respectively.

TABLE 1

Percentage of operations in different layers

| DNN | AlexNet | SVHN | CIFAR-10 | LeNet-5 | VGG-7 | ResNet-18 | PTB-RNN | PTB-LSTM |
|---|---|---|---|---|---|---|---|---|
| Convolution Layers | 91.8 | 96.6 | 98.4 | 86.6 | 97 | 99.4 | — | — |
| Fully-Connected Layers | 8.1 | 3.3 | 1.5 | 13.1 | 2.6 | 0.5 | 99.9 | 99.9 |

TABLE 1-continued

| Percentage of operations in different layers | | | | | | | | |
|---|---|---|---|---|---|---|---|---|
| DNN | AlexNet | SVHN | CIFAR-10 | LeNet-5 | VGG-7 | ResNet-18 | PTB-RNN | PTB-LSTM |
| Other Layers | 0.1 | 0.1 | 0.1 | 0.3 | 0.3 | 0.1 | 0.1 | 0.1 |

This patent document discloses techniques that can be implemented in various embodiment to address the aforementioned challenges based on the fact that the set of MACC operations within a vector dot-product can be partitioned, rearranged, and interleaved at the bit level without affecting the mathematical integrity of the vector dot-product. As such, the techniques disclosed herein do not rely on approximate computing techniques to enable mixed-signal acceleration. Instead, the disclosed techniques can be implemented to rearrange the bit-wise arithmetic calculations to utilize lower bitwidth analog units for higher bitwidth operations. A binary value can be expressed as the sum of products similar to dot-product, which is also a sum of multiplications $\alpha=\vec{X}\cdot\vec{W}=\Sigma_i x_i \times w_i$. Value b can be expressed as $b=\Sigma_i(2^i \times b_i)$ where $b_i$s are the individual bits or as $b=\Sigma_i(2^{4i} \times bp_i)$, wherein $bp_i$s are 4-bit partitions. An interleaved bit-partitioned arithmetic can effectively use the distributive and associative property of multiplication and addition at the bit granularity.

In some embodiments, the disclosed techniques can be implemented to bit-partition all elements of the two vectors and distribute the MACC operations of the dot-product over the bit partitions. Therefore, the lower bitwidth MACC becomes the basic operator that is applied to each bit-partition. Then, the associative property of the multiply can be exploited to group bit-partitions that are at the same significance position. This significance-based rearrangement enables factoring out the power-of-two multiplicand that signifies the position of the bit-partitions. The factoring enables performing the wide group-based low-bitwidth MACC operations simultaneously as a spatially parallel operation in the analog domain, while the group shares a single A/D convertor. The power-of-two multiplicand is applied later in the digital domain to the accumulated result of the group operation. To this end, the vector dot-product can be rearchitected as a series of wide (across multiple elements of the two vectors), interleaved and bit-partitioned arithmetic and re-aggregation. Therefore, the reformulation significantly reduces the rate of costly A/D conversion by rearranging the bit-level operations across the elements of the vector dot-product. Using low-bitwidth operands for analog MACCs provides a larger headroom between the value encoding levels in the analog domain. The headroom lead tackles the limited range of encoding and offers higher robustness to noise, an inherent non-ideality in the analog mode. Additionally, using lower bitwidth operands reduces the energy/area overhead imposed by A/D and D/A convertors that roughly scales exponentially with the bitwidth of operands.

Furthermore, at the circuit level, the accelerator can be designed to use switched-capacitor circuitry that stores the partial results as electric charge over time without conversion to the digital domain at each cycle. The low-bitwidth MACCs are performed in charge domain with a set of charge-sharing capacitors, thereby lowering the rate of A/D conversion as it implements accumulation as a gradual storage of charge in a set of parallel capacitors. These capacitors not only aggregate the result of a group of low-bitwidth MACCs, but also enable accumulating results over time. As such, the architecture enables dividing the longer vectors into shorter sub-vectors that are multiply-accumulated over time with a single group of low bitwidth MACCs. The results are accumulated over multiple cycles in the group's capacitors. Because the capacitors can hold the charge from cycle to cycle, the A/D conversion is not necessary in each cycle. This reduction in rate of A/D conversion is in addition to the amortized cost of A/D convertors across the bit-partitioned analog MACCs of the group.

In some embodiments, the disclosed techniques can be used to implement a clustered three-dimensional (3D)-stacked microarchitecture (also referred to as BIHIWE), that provides the capability to integrate copious number of low-bitwidth switched-capacitor MACC units that enables the interleaved bit-partitioned arithmetic. The lower energy of mixed-signal computations offers the possibility of integrating a larger number of these units compared to their digital counterpart. To efficiently utilize the more sizable number of compute units, a higher bandwidth memory subsystem is needed. Moreover, one of the large sources of energy consumption in DNN acceleration is off-chip DRAM accesses. In some embodiments, a clustered architecture for BIHIWE is devised to leverage 3D-stacking for its higher bandwidth and lower data transfer energy. Evaluating the carefully balanced design of BIHIWE with eight DNN benchmarks shows that BIHIWE delivers 4.5 times over the leading purely digital 3D-stacked DNN accelerator TETRIS, with virtually no loss (<1%) in classification accuracy. BIHIWE offers 31.1 times higher Performance-per-Watt compared to Titan Xp GPU with 8-bit execution while running 1.7 times faster. With these benefits, the disclosed techniques mark an initial effort that paves the way for a new shift in DNN acceleration.

Wide, Interleaved, and Bit-Partitioned Arithmetic

Bit-Level Partitioning and Interleaving of MACCs

The mathematical formulation enables utilizing low bitwidth mixed-signal units in spatially parallel groups. FIG. 1A illustrates an example of bit-partitioning multiply-accumulation in accordance with one or more embodiments of the present technology. In FIG. 1A, bit-level operations of dot-product are performed on vectors with 2-elements containing 4-bit values. Each 4-bit element can be written in the form of sum of 2-bit partitions multiplied by powers of 2 (that is, left shift). As discussed, vector dot-product is also a sum of multiplications. Therefore, by using the distributive property of addition and multiplication, the vector-dot product can be re-written in terms of the bit partitions. The associativity of the addition and multiplication is also leveraged to group the bit-partitions in the same positions together. For instance, in FIG. 1A, the black partitions that represent the Most Significant Bits (MSBs) of the $\vec{W}$ vector are multiplied in parallel to the dark grey partitions, representing the MSBs of the $\vec{X}$. Because of the distributivity of multiplication, the shift amount of (2+2) can be postponed after the bit-partitions are multiply-accumulated. The different shades of the boxes in FIG. 1A illustrates the interleaved grouping of the bit-partitions. Each group is a set of spatially parallel bit-partitioned MACC operations that are drawn from different elements of the two vectors. The low-bitwidth nature of these operations enables execution in the analog domain without the need for A/D conversion for each individual bit-partitioned operation. As such, the reformulation amortizes the cost of A/D conversion across the bit-partitions of different elements of the vectors as elaborated below.

Wide, Interleaved, and Bit-Partitioned Vector Dot-Product

Figure 1B:
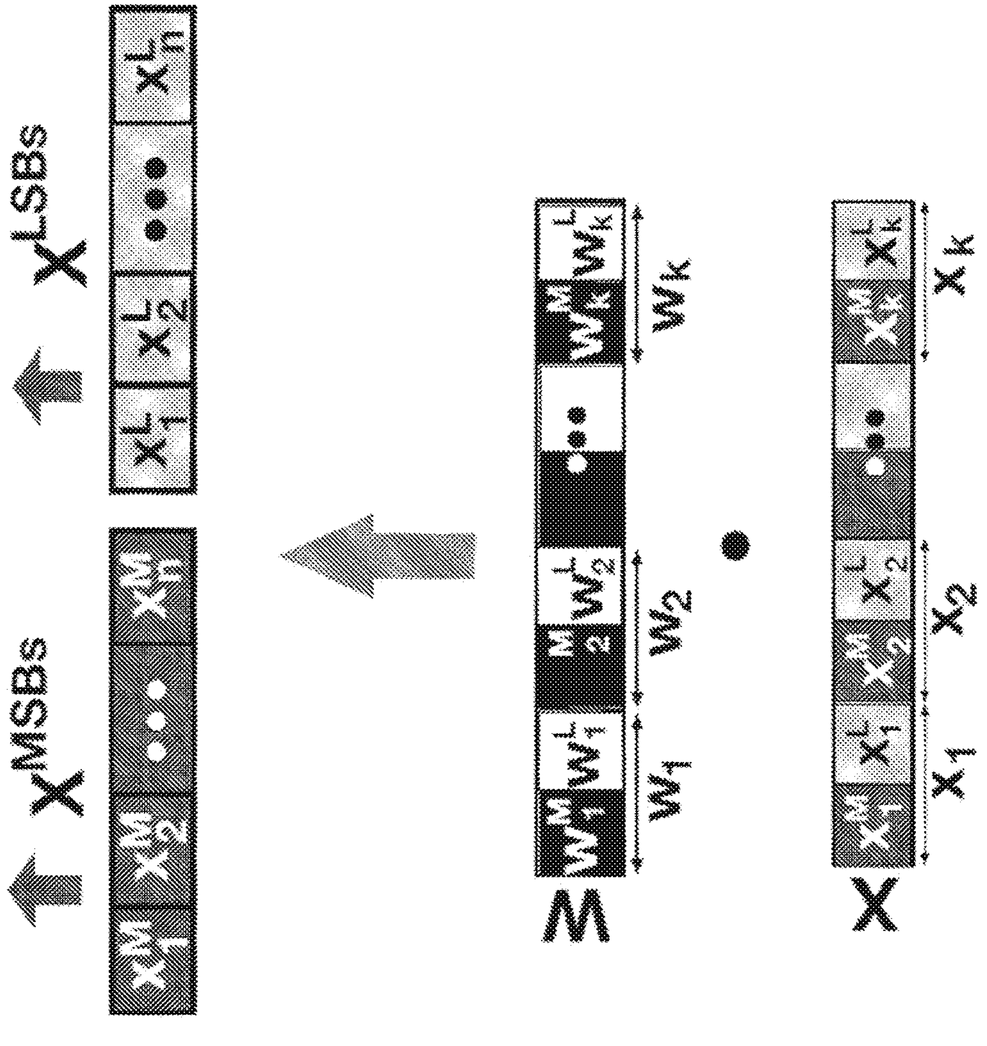
FIG. 1B illustrates an example of vector dot-product operation with 4-bit elements that are bit partitioned to 2-bit sub-elements in accordance with one or more embodiments of the present technology.

FIG. 1B illustrates an example vector dot-product operation with 4-bit elements that are bit partitioned to 2-bit sub-elements in accordance with one or more embodiments of the present technology. As illustrated, the elements of vector X, denoted as $x_i$, are first bit partitioned to $$x_i^L \text{ and } x_i^M.$$

The former represents the two Least Significant Bits (LSBs) and the latter represents the Most Significant Bits (MSBs). Similarly, the elements of vector W are also bit partitioned to the $$w_i^L \text{ and } w_i^M$$

sub-elements. Then, each vector (e.g., W) is rearranged into two bit-partitioned sub-vectors, $W^{LSBs}$ and $W^{MSBs}$. In some implementations, the size of bit-partition is fixed across the entire architecture. Therefore, the rearrangement is just rewiring the bits to the compute units that imposes modestly minimal overhead (less than 1%). However, in some implementations, the size of bit-partition can be variable for different architectures.

Figure 1C:
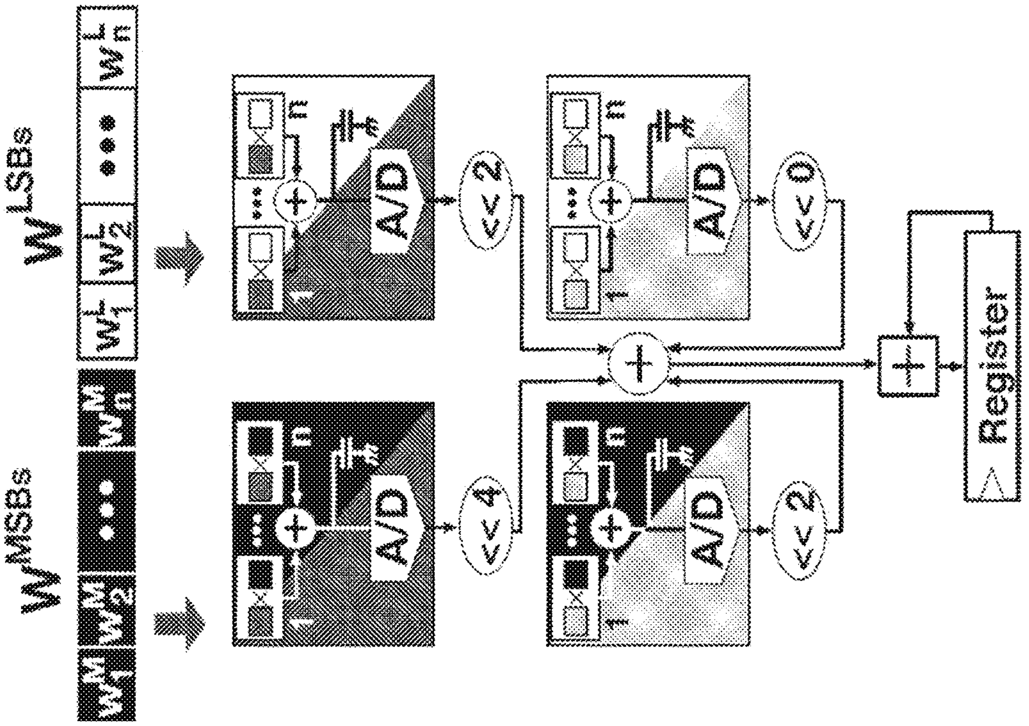
FIG. 1C illustrates an example of bit-partitioned vector rearrangement in accordance with one or more embodiments of the present technology.

FIGS. 1A-C are examples for illustration purposes, and thus there is no need for extra storage or movement of elements. As depicted with different shading, after the rewiring, $W^{LSBs}$ represents all the least significant bit-partitions from different elements of vector W, while the MSBs are rewired in $W^{MSBs}$. The same rewiring is repeated for the vector X. This rearrangement puts all the bit-partitions from all the elements of the vectors with the same significance in one group, denoted as $W^{LSBs}$, $W^{MSBs}$, $X^{LSBs}$, $X^{MSBs}$. Therefore, when a pair of the groups (e.g., $X^{MSBs}$ and $W^{MSBs}$ in FIG. 1C) are multiplied to generate the partial products, (1) the shift amount ("4" in this case) is the same for all the bit-partitions and (2) the shift can be done after partial products from different sub-elements are accumulated together.

As shown in FIG. 1C, the low-bitwidth elements are multiplied together and accumulated in the analog domain. Accumulation in the digital domain would require an adder tree which is costly compared to the analog accumulation that merely requires connectivity between the multiplier outputs. It is only after several analog multiply-accumulations that the results are converted back to digital for shift and aggregation with partial products from the other groups. The size of the vectors usually exceeds the number of parallel low-bitwidth MACCs, in which case the results need to be accumulated over multiple iterations. As described in the next section, the accumulations are performed in two steps. The first step accumulates the results in the analog domain through charge accumulation in capacitors before A/D convertors (see FIG. 1C). In the second step, these converted accumulations are to be added up in the digital domain using a register. For this pattern of computation, the distributive and associative property of multiplication and addition are used for dot-product but at the bit granularity. This rearrangement and spatially parallel (e.g., wide) bit-partitioned computation is in contrast with temporally bit-serial digital and analog DNN accelerators.

Mixed-Signal Architecture Design for Wide Bit-Partitioning

To exploit the aforementioned arithmetic, BIHIWE includes a mixed-signal building block that performs wide bit-partitioned vector dot-product. BIHIWE then organizes these building blocks in a clustered hierarchical design to efficiently make use of its copious number of parallel low-bitwidth mixed-signal MACC units. The clustered design enables integrating a larger number of parallel operators than the digital counterpart.

Wide Bit-Partitioned Mixed-Signal MACC

Figure 2A:
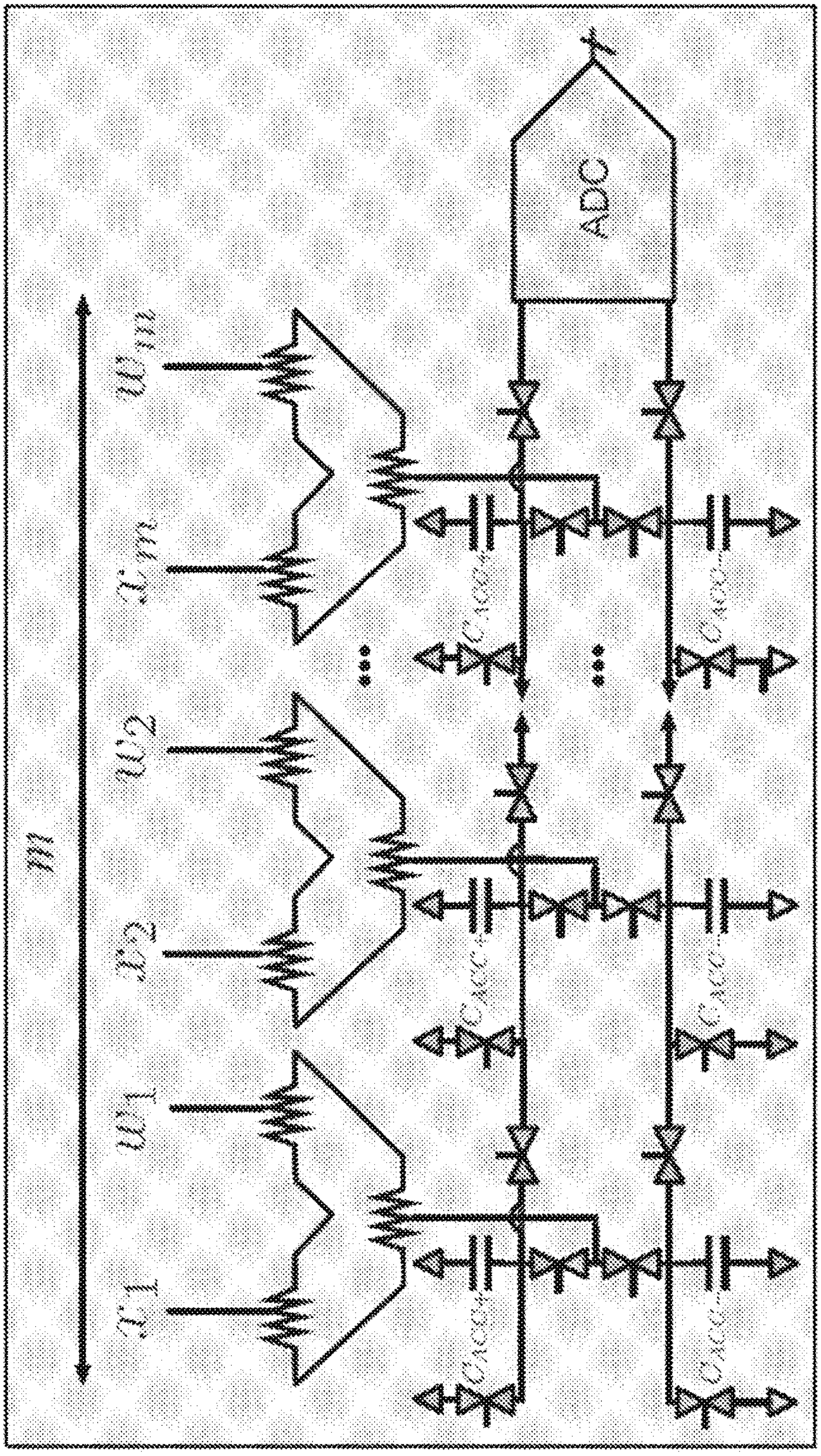
FIG. 2A illustrates an example of wide bit-partitioned vector dot-product in accordance with one or more embodiments of the present technology.
Figure 2B:
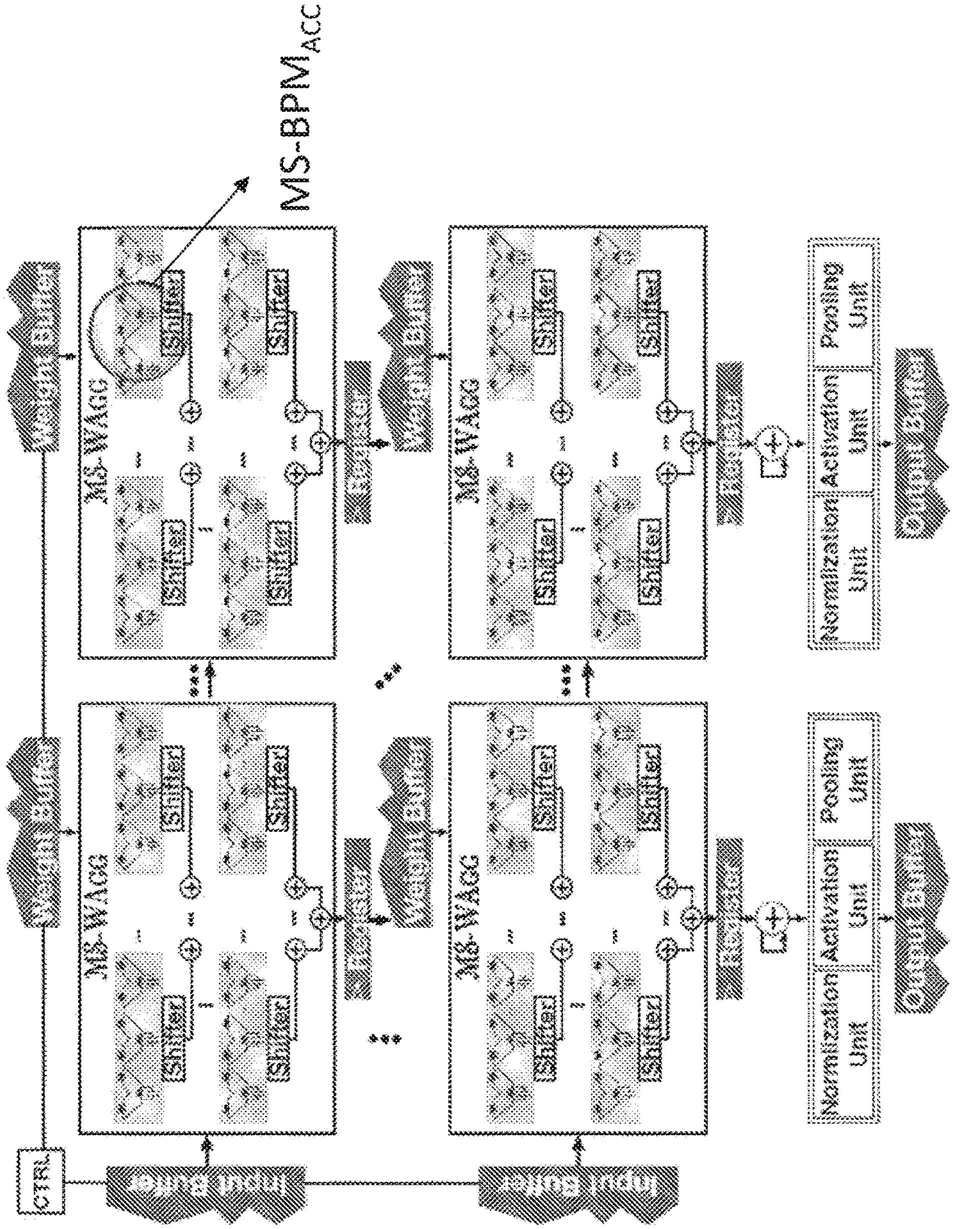
FIG. 2B depicts a two-dimensional (2D) array of an example Mixed-Signal Wide Aggregator (MS-WAGG) design in accordance with one or more embodiments of the present technology.
Figure 2C:
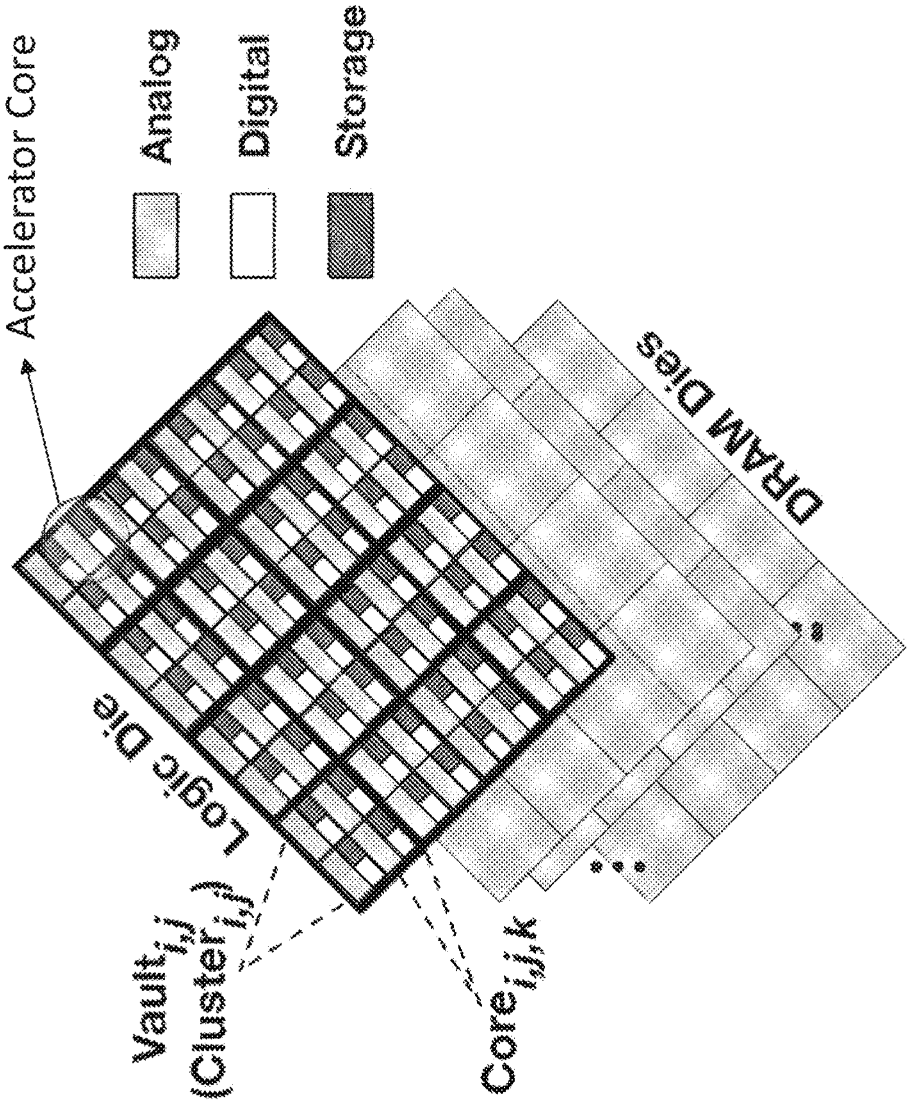
FIG. 2C illustrates an example clustered architecture in accordance with one or more embodiments of the present technology.

FIGS. 2A-C illustrate an example hierarchically clustered architecture of BIHIWE in accordance with one or more embodiments of the present technology. As FIG. 2A shows, the building block of BIHIWE is a collection of low-bitwidth analog MACCs that operate in parallel on sub-elements from the two vectors under dot-product. This wide structure is also referred to as MS-BPMACC. The low-bitwidth MACCs can be designed using switched-capacitor circuitry because such design lowers the rate of A/D conversion as it implements accumulation as a gradual storage of charge in a set of parallel capacitors. These capacitors not only aggregate the results of low-bitwidth MACCs, but also enable accumulating results over time. As such, longer vectors are divided into shorter sub-vectors that are multiply-accumulated over time without the need to convert the intermediate results back to the digital domain. It is only after processing multiple sub-vectors that the accumulated result is converted to digital, significantly reducing the rate of costly A/D conversions.

As shown in FIG. 2A, each low-bitwidth MACC unit is equipped with its own pair of local capacitors, which perform the accumulation over time across multiple sub-vectors. The pair is used to handle positive and negative values by accumulating them separately on one or the other capacitor, which is discussed further in detail in Section 4. After a pre-determined number of private accumulations in the analog domain, the partial results need to be accumulated across the low-bitwidth MACCs. In that cycle, the transmission gates between the capacitors (e.g., as shown in FIG. 2A) connect them and a simple charge sharing between the capacitors yields the accumulated result for the MS-BPMACC. That is when a single A/D conversion is performed, the cost of which is not only amortized across the parallel MACC units but also over time across multiple sub-vectors.

Mixed-Signal Wide Aggregator

In some embodiments, MS-BPMACCs only process low-bitwidth operands. However, they cannot combine these operations to enable higher bit-width dot-products. A collection of MS-BPMACCs can provide this capability as discussed in connection with FIGS. 1A-C. This structure is referred to as MS-WAGG as it is a Mixed Signal Wide Aggregator. FIG. 2B depicts a 2D array of an example MS-WAGG design in accordance with one or more embodiments of the present technology. The example MS-WAGG design comprises 16 MS-BPMACCs to perform 8-bit by 8-bit vector dot-product with 2-bit partitioning. In this case, the number 16 comes from the fact that each of the two 8-bit operands can be partitioned to four 2-bit values. Each of the four 2-bit partitions of the multiplicand need to be multiply-accumulated with all the multiplier's four 2-bit partitions. As discussed previously, each MS-WAGG also performs the necessary shift operations to combine the low-bitwidth results from its 16 MS-BPMACCs. By aggregating the partial results of each MS-BPMACC, the MS-WAGG unit generates a scalar output which is stored on its output register. As illustrated in FIGS. 2A-C, a collection of these MS-WAGGs constitute an accelerator core from which the clustered architecture of BIHIWE is formed.

Hierarchically Clustered Architecture

In some embodiments, the disclosed MS-WAGG consumes 5.4 times less energy for a single 8-bit by 8-bit MACC in comparison with a fully-digital logic. As such, it is possible to integrate a larger number of mixed-signal compute units on a chip with a given power budget compared to a digital architecture. To efficiently utilize the larger number of available compute units, a high bandwidth memory substrate is required. Moreover, one of the large sources of energy consumption in DNN acceleration is off-chip DRAM accesses. To maximize the benefits of the mixed-signal computation, 3D-stacked memory is an attractive option since it reduces the cost of data accesses and provides a higher bandwidth for data transfer between the on-chip compute and off-chip memory. Correspondingly, a clustered architecture for BIHIWE with a 3D-stacked memory substrate is developed as shown in FIG. 2C. The mixed-signal logic die of BIHIWE is stacked over the DRAM dies with multiple vaults, each of which is connected to the logic die with several through-silicon-via (TSV)s. The 3D memory substrate of BIHIWE is modeled using Micron's Hybrid Memory Cube (HMC).

In some embodiments, BIHIWE is a hierarchically clustered architecture that allocates multiple accelerator cores as a cluster to each vault. FIG. 2B depicts a single accelerator core in accordance with one or more embodiments of the present technology. As shown in FIG. 2B, each core (e.g., as shown in FIG. 2C) is self-sufficient and packs a mixed-signal systolic array of MS-WAGGs as well as the digital units that perform pooling, activation, normalization, etc. The mixed-signal array is responsible for the convolutional and fully connected layers. In some embodiments, wide and interleaved bit-partitioned execution within MS-WAGGs is orthogonal to the organization of the accelerator architecture.

Accelerator Core

Figure 5A:
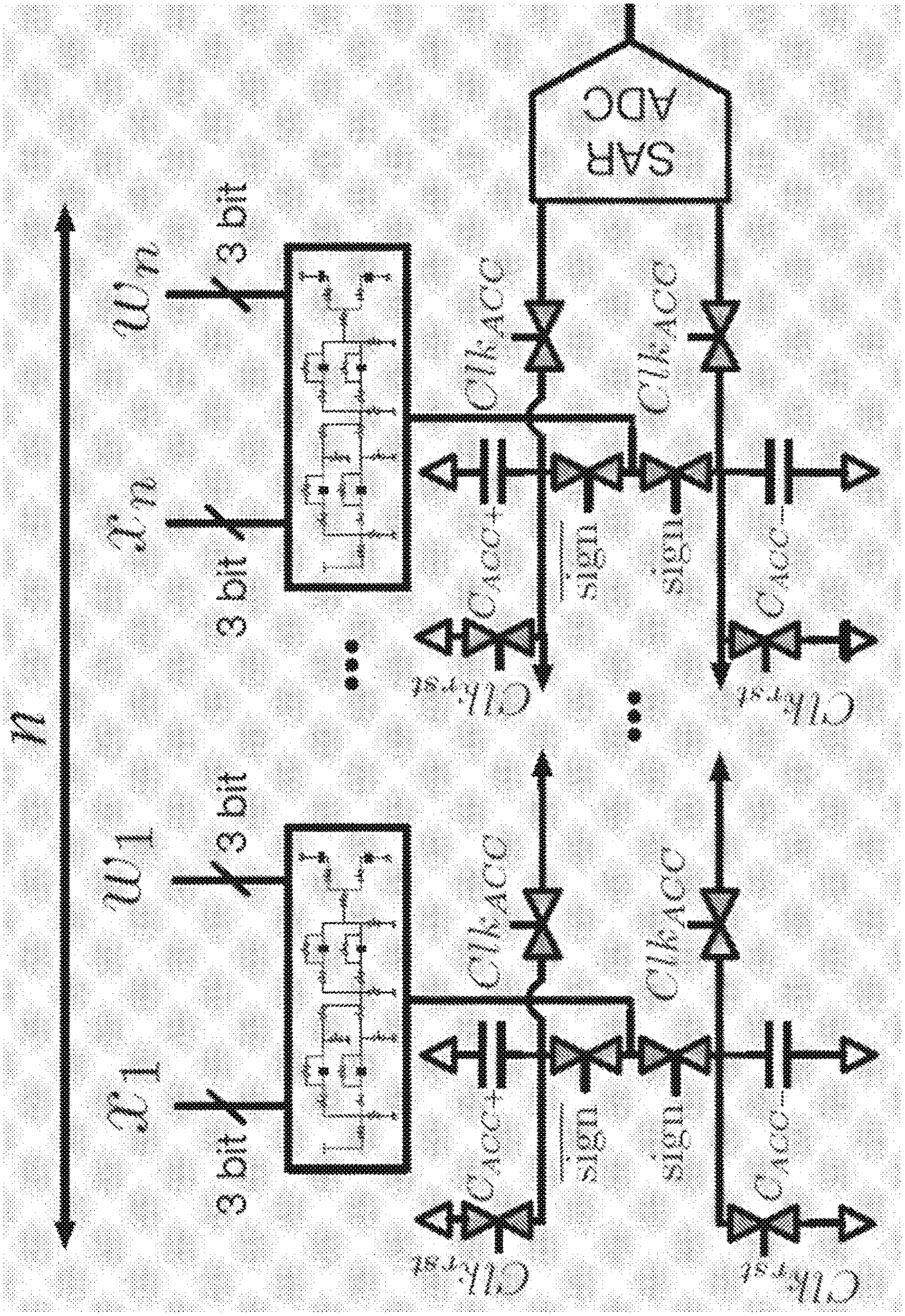
FIG. 5A illustrates an example array of n switched-capacitor MACCs that forms an Mixed-Signal low-Bitwidth Parallel MACC (MS-BPMACC) in accordance with one or more embodiments of the present technology.

As FIG. 2B depicts, the first level of hierarchy is the accelerator core and its 2D systolic array that utilizes multiple MS-WAGGs. Each MS-WAGG includes multiple MS-BPMACC as depicted in FIG. 2A or FIG. 5A. The Input Buffers and Output Buffers are shared across the columns and rows, respectively. Each MS-WAGG has its own Weight Buffer. This organization reduces the cost of on-chip data accesses as inputs are reused with multiple filters. Furthermore, each buffer needs to supply a sub-vector, rather than a scalar, in each cycle to the MS-WAGGs. Because the MS-WAGG generates only a scalar due to the fact that dot-product generates a scalar output, the rewiring of the inputs and weights is performed inside the MS-WAGGs for the size of bit-partitions is fixed. As such, there is no need to reformat any of inputs, activations, or weights. As the outputs of MS-WAGGs flow down the columns, they get accumulated to generate the output activations that are fed to each column dedicated Normalization/Activation/Pooling Units. To preserve the accuracy of the DNN model, the intermediate results are stored as 32-bit digital values and intra-column aggregations are performed in the digital mode.

On-Chip Data Delivery for Accelerator Cores

To minimize data movement energy and maximally exploit the large degrees of data-reuse offered by DNNs, BIHIWE uses a statically scheduled bus that is capable of multicasting/broadcasting data across accelerator cores. Compared to complex interconnections, the choice of statically-scheduled bus significantly simplifies the hardware by alleviating the need for complicated arbitration logic and FIFOs/buffers required for dynamic routing. Moreover, the static schedule enables the BIHIWE compiler stack to cut the DNN layers across accelerator cores while maximizing inter- and intra-core data-reuse. The static schedule is encoded in the form of data communication instructions that are responsible for (1) fetching data tiles from the 3D-stacked memory and distributing them across accelerator cores or (2) writing output data tiles back from the accelerator cores to the 3D-stacked memory. Details regarding the optimization algorithm used by the BIHIWE compiler stack to cut and tile the DNN layers across the cores are further discussed in Section 6. Details regarding the data communication instructions are further discussed in Section 7.

Switched-Capacitor Circuit Design for Bit-Partitioning

BIHIWE exploits switched-capacitor circuitry for MS-BPMACC by implementing MACC operations in the charge-domain rather than using resistive-ladders for computation in the voltage-current domain. Compared to the resistive-ladder approach, switched-capacitors provide the advantages of (1) enabling result accumulation in the analog domain by storing them as electric charge, as well as eliminating the need for A/D conversion every cycle, and (2) making multiplications depend only on the ratio of the capacitor sizes rather than the absolute value of their capacitances. The second property enables reduction of capacitor sizes, improving the energy and area of MACC units as well as making them more resilient to process variation. That is, as long as the ratio stay relatively unchanged the absolute variations in the capacitor sizes can be tolerated.

Low-Bitwidth Switched-Capacitor MACC

Figure 3:
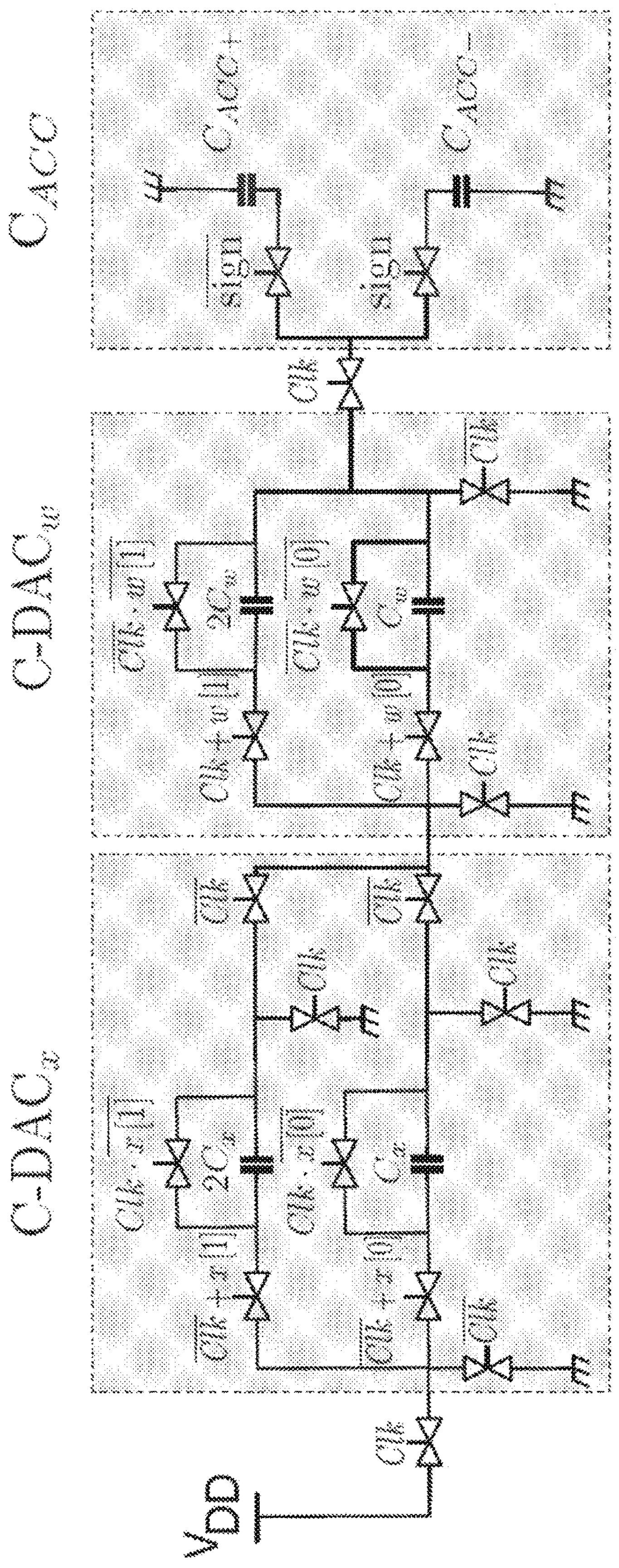
FIG. 3 depicts an example design of a single 3-bit sign-magnitude Multiply-Accumulate (MACC) in accordance with one or more embodiments of the present technology.

FIG. 3 depicts an example design of a single 3-bit sign-magnitude MACC in accordance with one or more embodiments of the present technology. The $x_s x_1 x_0$ and $w_s w_1 w_0$ denote the bit-partitions operands. The result of each MACC operation is retained as electric charge in the accumulating capacitor ($C_{ACC}$). In addition to $C_{ACC}$, the MACC unit includes two capacitive Digital-to-Analog Converters, one for inputs (C-DAC$_X$) and one for weights (C-DAC$_W$). The C-DAC$_X$ and C-DAC$_W$ convert the 2-bit magnitude of the input and weight to the analog domain as an electric charge proportional to $|x|$ and $|w|$ respectively. C-DAC$_X$ and C-DAC$_W$ are each composed of two capacitors (($C_X$, $2C_X$) and ($C_W$, $2C_W$)) which operate in parallel and are combined to convert the operands to analog domain. Each of these capacitors are controlled by a pair of transmission gates which determine if a capacitor is active or inactive. Another set of transmission gates connects the two C-DACs and shares charge when partitions of x and w are multiplied. The resulting shared charge is stored on either $C_{ACC+}$ or $C_{ACC-}$ depending on the "sign" control signal produced by $X_s \oplus w_s$. During multiplication, the transmission gates are coordinated by a pair of complimentary non-overlapping clock signals, Clk and $\overline{\text{Clk}}$.

Charge-Domain MACC, Phase-by-Phase

Figure 4A:
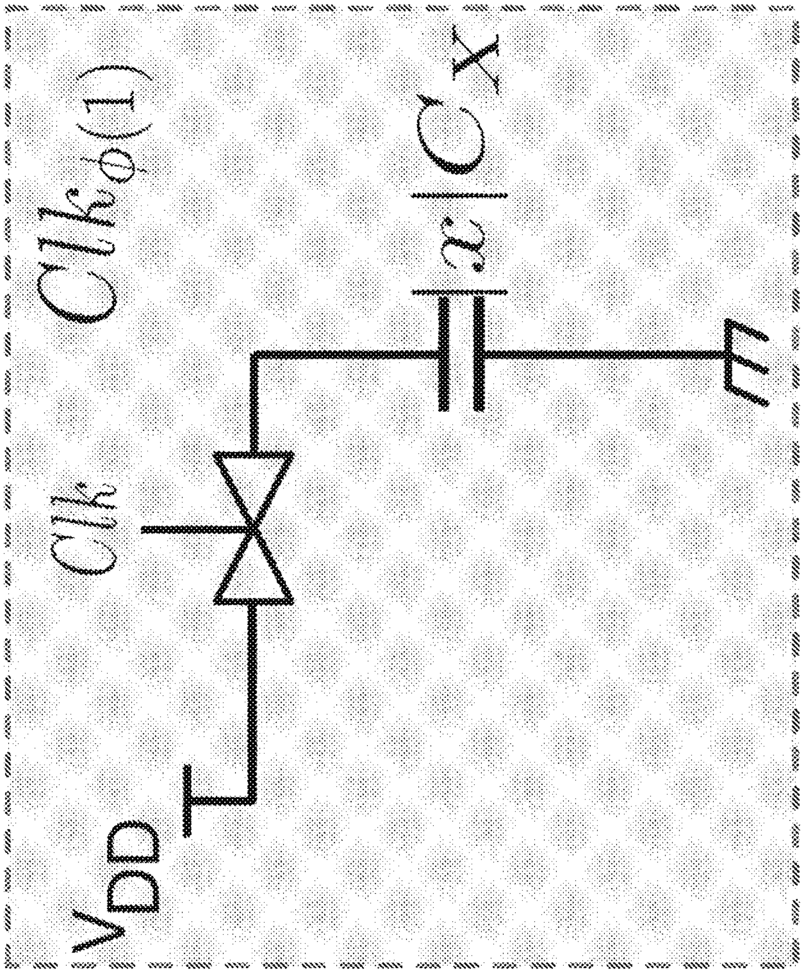
FIG. 4A illustrates a first phase of an example phase-by-phase process of a MACC and the corresponding active circuits in accordance with one or more embodiments of the present technology.
Figure 4B:
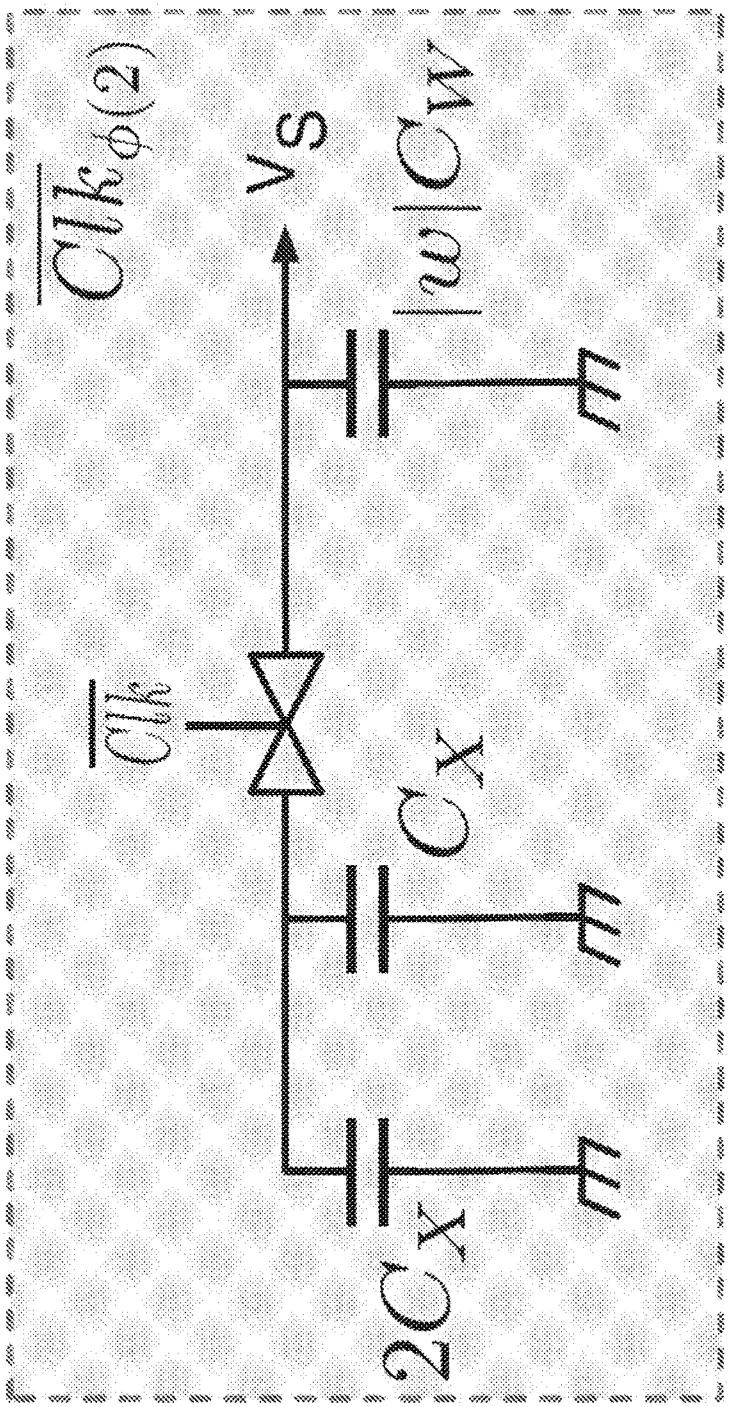
FIG. 4B illustrates a second phase of an example phase-by-phase process of a MACC and the corresponding active circuits in accordance with one or more embodiments of the present technology.
Figure 4C:
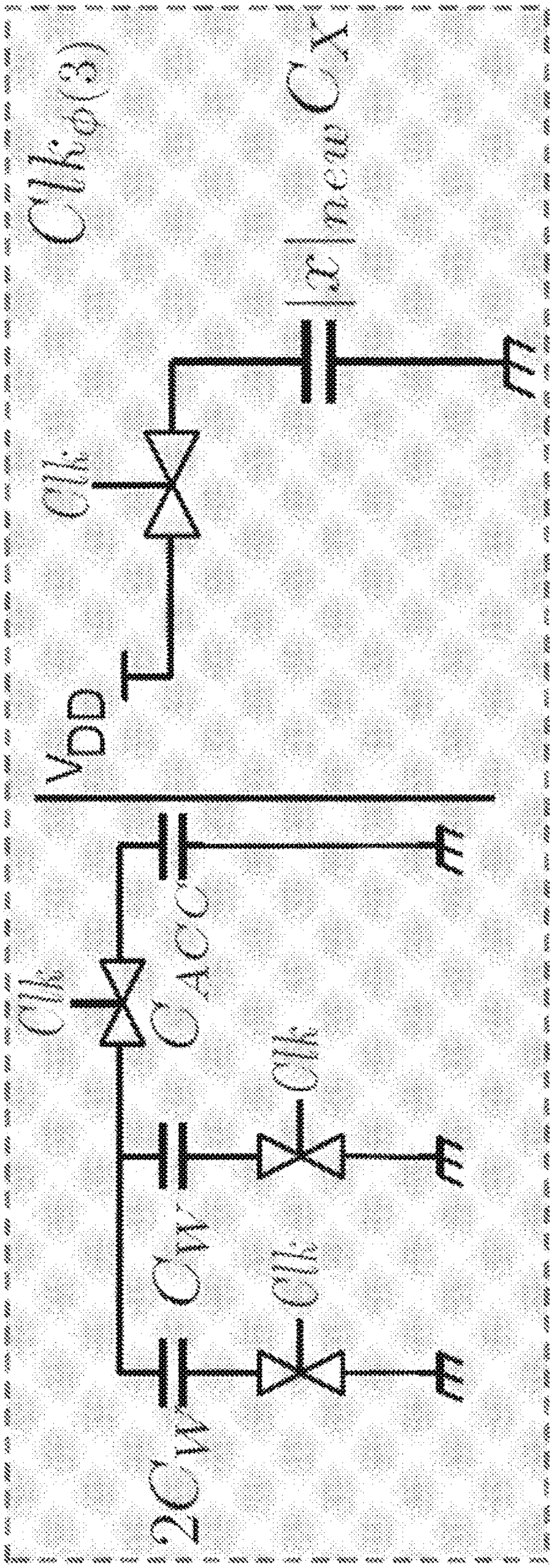
FIG. 4C illustrates a third phase of an example phase-by-phase process of a MACC and the corresponding active circuits in accordance with one or more embodiments of the present technology.

FIGS. 4A-C illustrates an example phase-by-phase process of a MACC and the corresponding active circuits in accordance with one or more embodiments of the present technology. The phases of which are described below.

$Clk_{\varphi(1)}$: The first phase (e.g., as shown in FIG. 4A) includes the input capacitive DAC converting digital input (x) to a charge proportional to the magnitude of the input $|x|C_X$. As a result, the sampled charge ($Q_{sx}$) in C-DAC$_X$ in the first phase is equal to:

$$Q_{SX}=v_{DD}\times(|X|C_x) \qquad \text{Eq. (1)}$$

$\overline{Clk_{\varphi(2)}}$: In the second phase (e.g., as shown in FIG. 4B), the multiplication happens via a charge-sharing process between C-DAC$_X$ and C-DAC$_W$. C-DAC$_W$ converts the |w| to the charge domain. At the same time, the C-DAC$_X$ redistributes its sampled charge ($Q_{sx}$) over all of its capacitors ($3\times C_X$) as well as the equivalent capacitor of C-DAC$_W$. The voltage ($V_s$) at the junction of C-DAC$_X$ and C-DAC$_W$ is as follows:

$$V_S = \frac{Q_{SX}}{C_{eq}} = \frac{v_{DD}\times(|X|C_X)}{3C_X+|w|C_W} \qquad \text{Eq. (2)}$$

Because the sampled charge is shared with the weight capacitors, the stored charge ($Q_{sw}$) on C-DAC$_W$ is equal to:

$$Q_{SW} = V_S\times|w|C_W = |x|\times|w|\left(\frac{C_W C_W v_{DD}}{3C_X+|w|C_W}\right) \qquad \text{Eq. (3)}$$

Eq. (3) shows that the stored charge on C-DAC$_W$ is proportional to |x|×|w|, but includes a non-linearity due to the |w| term in the denominator. To suppress this non-linearity, $C_X$ and $C_W$ are chosen such that $3C_X >> |w|C_W$. With this choice, $Q_{sw}$ becomes $$Q_{SW} = |x|\times|w|\left(\frac{C_W v_{DD}}{3}\right).$$

$Clk_{\varphi(3)}$: In the last phase, as shown in FIG. 4C, the charge from multiplication is shared with $C_{ACC}$ for accumulation. The sign bits ($x_s$ and $w_s$) determine which of $C_{ACC+}$ or $C_{ACC-}$ is selected for accumulation. The sampled charge by $|w|C_W$ is then redistributed over the selected $C_{ACC}$ as well as all the capacitors of C-DAC$_W$ (=3 $C_W$). In some cases, $C_{ACC}$ needs to be infinitely larger than $3C_W$ to completely absorb the charge from multiplication. However, some charge can remain unabsorbed, leading to a pattern of computational error, which can be mitigated as discussed in further detail in Section 5. The $V_{ACC}$ voltage on $C_{ACC}$ can be:

$$V_{ACC} = |x||w|\left(\frac{C_W v_{DD}}{3\times C_{ACC}}\right) \qquad \text{Eq. (4)}$$

While the charge sharing and accumulation happens on $C_{ACC}$, a new input can be fed into C-DAC$_X$, starting a new MACC process in a pipelined fashion. This process can repeat for all low-bitwidth MACC units over multiple cycles before one A/D conversion.

Wide Mixed-Signal Bit-Partitioned MACC

Figure 5B:
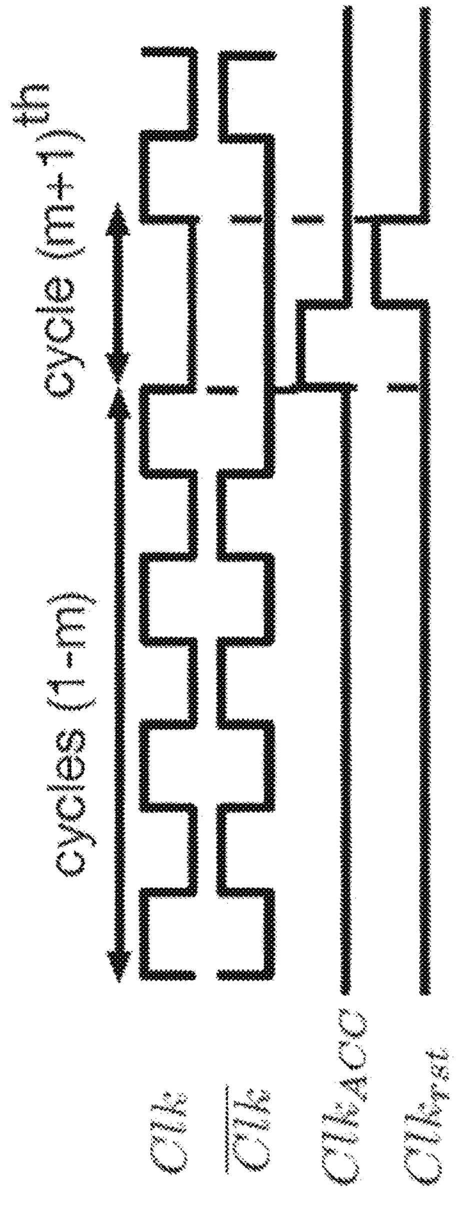
FIG. 5B illustrates example control signals and cycles of operations of the MACC unit in accordance with one or more embodiments of the present technology.

FIG. 5A illustrates an example array of n switched-capacitor MACCs that forms an MS-BPMACC in accordance with one or more embodiments of the present technology. FIG. 5B illustrates example control signals and cycles of operations of the MACC unit in accordance with one or more embodiments of the present technology. These low-bitwidth units perform the MACC operations for m cycles in the analog domain and store the results locally on their CACCs. For the BIHIWE microarchitecture, m and n can be selected to be 32 and 8 based on design space exploration (e.g., see FIG. 12). Over m cycles, mn low-bitwidth MACC operations accumulate results in their own private capacitors ($C_{ACC}$S). In cycle m+1, the private results get aggregated across all the MACC units within the MS-BPMACC. The single A/D converter in the MS-BPMACC is responsible for converting the aggregated result, which also starts at cycle m+1.

In the first phase of cycle m+1, all the n accumulating capacitors which store the positive values ($C_{ACC+}$) are connected together through a set of transmission gates to share their charge. Simultaneously, the same process happens for the $C_{ACC-}$. $Clk_{ACC}$ in FIGS. 5A-B is the control signal which connects the $C_{ACC}$s. The accumulating capacitors ($C_{ACC}$s) are also connected to a Successive Approximation Register (SAR) ADC and share their stored charge with the Sample and Hold block (S&H) of the ADC. This S&H block has differential inputs which samples the positive and negative results separately, subtracts them and holds them for the process of A/D conversion. In the second phase of the cycle m+1, $Clk_{rst}$ connects all the $C_{ACC}$s to ground so as to clear them for the next iteration of wide, bit-interleaved calculations.

Figure 12:
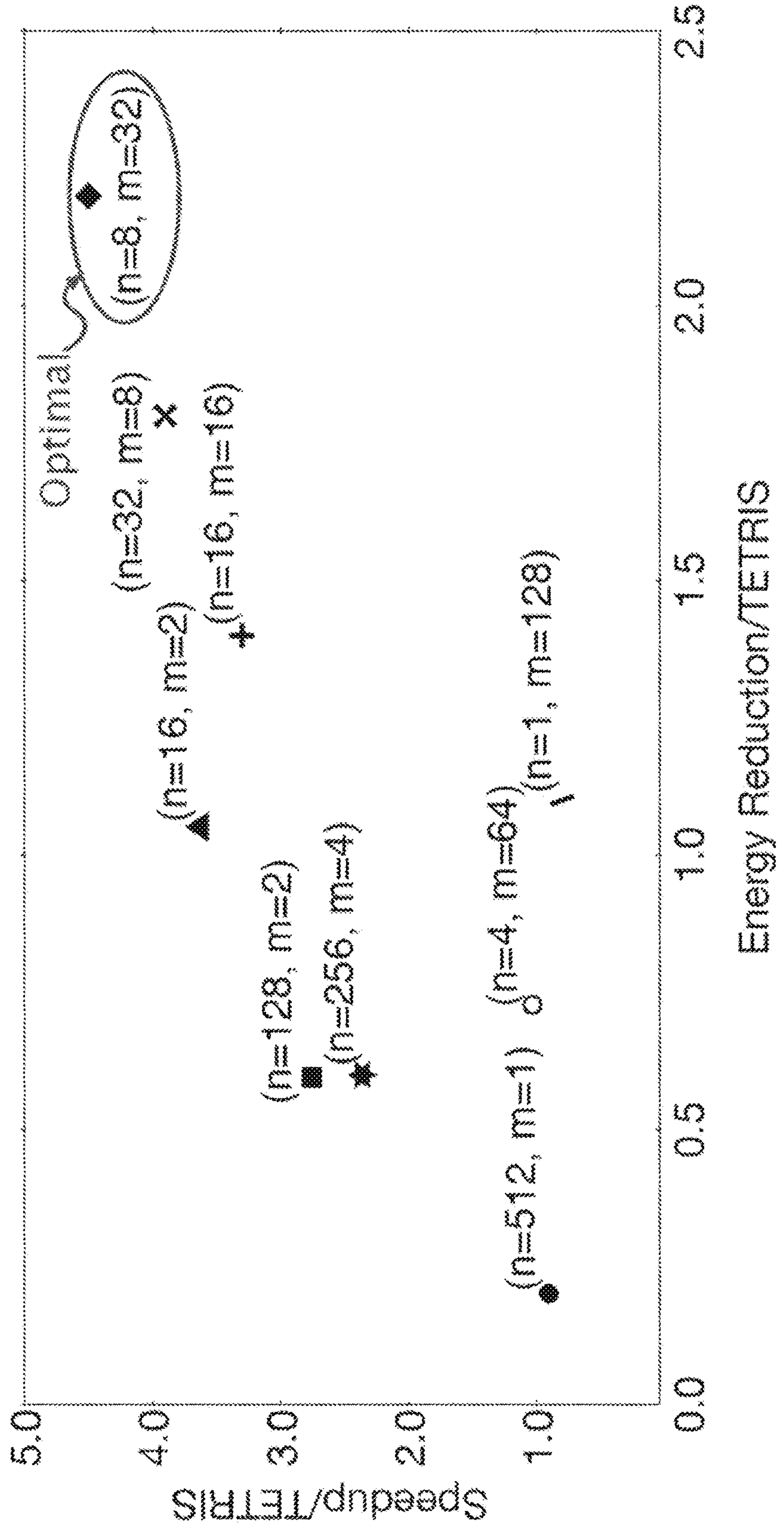
FIG. 12 illustrates an example design space exploration for different configurations of the MS-BPMACC unit in accordance with one or more embodiments of the present technology.

SAR ADC is a good choice when it comes to medium resolution (8-12 bits) and sampling rate (1-500 Mega Samples/sec). In some embodiments, a 10-bit, 10-Mega-Samples/sec SAR ADC can be chosen because it provides the balance between speed and resolution for MS-BP-MACCs. The design space exploration in FIG. 12 shows that this choice can make the grouping of 8 low-bitwidth MACCs optimal for m=32 cycles of operation. The process of A/D conversion takes m+1 cycles, pipelined with the sub-vector dot-product. Table 2 shows example breakdown of energy consumption within a MS-BPMACC that use 2-bit partitioning. As shown, performing an 8 bit-8 bit MACC using the interleaved bit-partitioned arithmetic based on this design requires 5.4 times less energy than a digital MACC which consumes around 1 pJ.

TABLE 2

Example energy consumption of MS-BPMACC

| Units | Energy |
|---|---|
| 1 MACC | 5.1 fJ |
| 256 MACCs | 1,305.6 fJ |
| SAR ADC (for 256 MACCs) | 1,660.0 fJ |
| Total Energy | 1,956.6 fJ |
| Total Energy per 2b-2b MACC | 11.6 fJ |
| Total Energy per 8b-8b MACC | 185.3 fJ |

Mixed-Signal Non-Idealities and Their Mitigations

Although analog circuitry offers reduction in the energy costs of DNN processing, performing the computations in this domain can lead to degradation in DNN classification accuracy. Thus, the error in these computations needs to be properly modeled and accounted for. In some embodiments, the MS-BPMACCs within BIHIWE are susceptible to (1) thermal noise due to electron agitation, and/or (2) computational error caused by transfer of charge between capacitors. The disclosed techniques can be implemented to mitigate the impact of utilizing analog circuits on DNN accuracy based on modeling these errors in software and retraining DNNs.

Thermal Noise

Thermal noise is an external signal introduced into an analog circuit by heat, distorting the real, desired signal and therefore voltage. This noise can be modeled according to a normal distribution, where the ideal voltage (μ) deviates relative to a value that comprises the Boltzmann constant (k), working temperature (T), and capacitor size (C) which produce the deviation $\sigma=\sqrt{kT/C}$. Within BIHIWE, switched-capacitor MACC units can be affected by the combined thermal noise resulting from the capacitor sizes for weights ($C_w$), accumulators ($C_{ACC}$), and/or the ratio of their total sizes ($\alpha=C_x/3C_w$). The noise from these capacitors increases during the m cycles of computation relative to their size ratio (α) and depends on the magnitude of the bit-partitioned weight during the last compute cycle ($|W_m|$). By applying the thermal noise equation used for similar MAC units to a MS-BPMACC unit performing m×n low-bitwidth operations, the standard deviation ($\sigma_{ACC}$) is described by Eq. (5):

$$\sigma_{ACC}=\sqrt{\frac{KT(\alpha|W_m|+3\alpha+3)}{9\alpha(\alpha+1)^2C_W}\left(\sum_{i=0}^{m}\left(\frac{\alpha}{1+\alpha}\right)^2 i\right)\times m} \quad \text{Eq. (5)}$$

Using the standard deviation ($\sigma_{ACC}$) above, the thermal noise ($\sigma_{th}$) can be computed based on deviation from the ideal voltage ($V_{ACC}$) at the output of an MS-BPMACC for a single low-bitwidth operation by setting the input LSB(|x|) and weight LSB(|w|) equal to 1 in Eq. (4), and dividing these values:

$$\sigma_{th}=\sigma_{ACC}\times\frac{3\times\alpha}{V_{DD}} \quad \text{Eq. (6)}$$

Computational Error Due to Incomplete Charge Transfer

Another source of error in mixed-signal computations can arise when charge is shared between capacitors during the multiplication and accumulation. Within each MACC unit in BIHIWE, the input capacitors (C-$DAC_X$) transfer sampled charge to the weight capacitors (C-$DAC_W$) to produce charge proportional to the multiplication result, but the resulting charge is subject to error relative to the ratio of weight and input capacitor sizes ($\beta=C_x/C_w$) as shown in Eq. (3). This shared charge in the weight capacitors can introduce more error when it is redistributed to the accumulating capacitor ($C_{ACC}$) which cannot absorb all of the charge, leaving a small portion remaining on the weight capacitors in subsequent cycles (α). Without taking these errors into account, the ideal voltage ($V_{ACC,Ideal}$) produced after m cycles of multiplication between an input ($X_i$) and weight ($W_i$) can be derived from Eq. (4) to produce the following:

$$V_{ACC,Ideal}[n]=\sum_{i=1}^{m}\frac{V_{DD}}{9\alpha}W_iX_i \quad \text{Eq. (7)}$$

By considering the aforementioned errors due to incomplete charge, the actual voltage at the accumulating capacitor after n cycles of multiplications ($V_{ACC,R[n]}$) becomes:

$$\frac{3\alpha}{3\alpha+|W_n|}V_{ACC,R[n-1]}+\frac{W_nX_n\beta}{(3\alpha+|W_n|)(3\beta+|W_n|)}V_{DD} \quad \text{Eq. (8)}$$

As it can be observed from the above equation, the output voltage of the accumulating capacitor after each cycle can attenuate by a factor of $$\frac{3\alpha}{3\alpha+|W_n|}$$

and is non-linear to the desired output (|W||X|) due to the magnitude of the weights ($|W_n|$) in the denominator of each added operand.

Error Modeling for DNNs

The effects of thermal noise and computational error can be modeled on classification accuracy in software by applying the equations described above to the convolutional and fully connected layers, and then retraining the DNNs to recover accuracy.

Modeling Thermal Noise

Thermal noise is included in DNN models by producing an error tensor from the models described above, then adding the error tensor to the output of convolutional and fully connected layers. Having computed the standard deviation of noise for a single MS-BPMACC ($\sigma_{th}$), an error tensor can be generated by scaling this value by the amount of MS-BPMACC operations required to complete a single multiplication $$\left(r=\left\lceil\frac{InputChannels}{m\times n}\right\rceil\right)$$

as well as the amount of bit-shifts applied to each result, e.g., 85:

$$N(\mu=0,\sigma^2=(\sigma_{th}\times r\times 85)^2) \quad \text{Eq. (9)}$$

From this distribution, values can be randomly selected to create error tensors which are added element-wise to the output of a given layer and propagated forward.

Modeling Computational Error

Computational error in individual multiplication operations can be accounted for in software by including the multiplicative factors shown in Eq. (8) in DNN weights. Weight tensors in fully connected and convolutional DNN layers can be decomposed into groups corresponding to MACC unit operation cycles, where individual weight values ($W_i$) are scaled to new weight values ($W_i'$) with the computational error shown by Eq. (10):

$$W_i'=\frac{W_i}{3\alpha+|W_i|}\frac{\beta V_{DD}}{3\beta+|W_i|}\prod_{j=i+1}^{n-1}\frac{3\alpha}{3\alpha+|W_j|},\ \forall\, 0\le i\le n-1 \quad \text{Eq. (10)}$$

Once each weight has been updated according to this equation and the cycle in which it is performed, the weight tensor is stored in its original shape for retraining.

BIHIWE Compiler Stack

Figure 6:
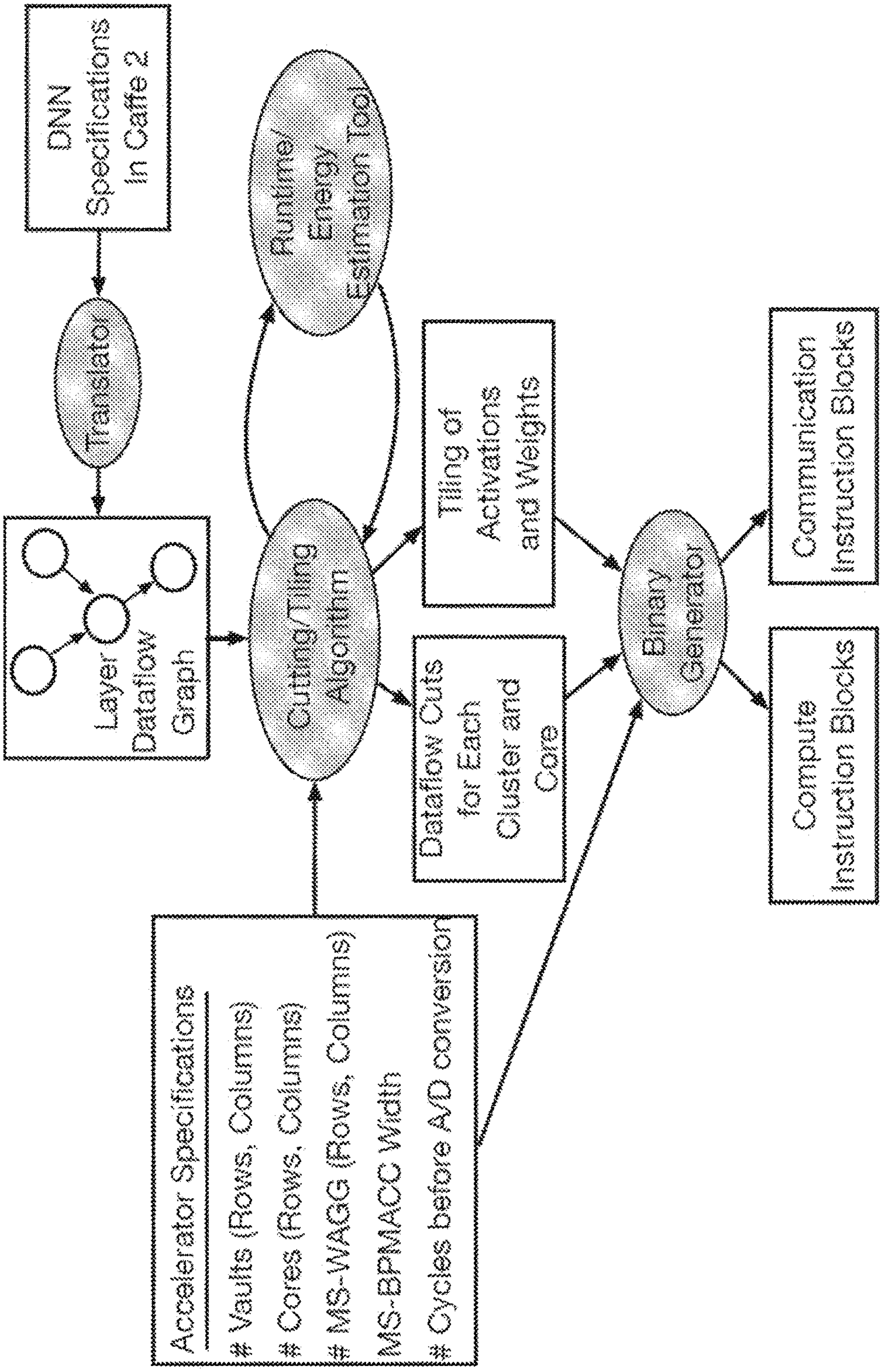
FIG. 6 illustrates an example compilation stack in accordance with one or more embodiments of the present technology.

In some embodiments, as FIG. 6 shows, DNNs are compiled to BIHIWE through a multi-stage process, e.g., beginning with a Caffe2 DNN specification file. The high-level specification provided in the Caffe2 file is translated to a layer DataFlow Graph (DFG) that preserves the structure of the network. The DFG goes through an algorithm that cuts the DFG and tiles the data to map the DNN computation to the accelerator clusters and cores. The tiling also aims to optimize the transfer of model parameters to the mixed-signal logic die as they do not fit on the scratchpads. In addition to the DFG, the cutting/titling algorithm takes in the architectural specification of the BIHIWE microarchitecture. These specifications include the organizations and configuration (#rows, #columns) of the clusters, vaults, and cores as well as details of the MS-BPMACCs. To identify the best cuts and the tiles, the cutting/tiling algorithm exhaustively searches the space of possibilities, which is enabled through an estimation tool. Estimation is viable, as the DFG does not change, there is no hardware managed cache, and the accelerator architecture is fixed during execution. Thus, there are no irregularities that can hinder estimation. Algorithm 1 depicts an example cutting/tiling procedure. When cuts and tiles are determined, the compiler generates the binary code that contains the communication and computation instruction blocks. In some implementations, all the instructions are statically scheduled. The static scheduling can be extended to cluster coordination, and data communication and transfer.

Algorithm 1: Cutting/tiling algorithm for clustered acceleration

```
Initialize cut_opt[N] ← ∅
Initialize tiling_opt[N] ← ∅
for layer_i ∈DFG_DNN do
   s_opt ← ∞
   for tiling_i,j ∈layer_l do
      for cut_i,j,k ∈tiling_i,j do
            (runtime_i,j,k, energy_i,j,k) ←EstimationTool(tiling_i,j, cut_i,j,k)
         s_i,j,k ←runtime_i,j,k × energy_i,j,k
         if s_i,j,k < s_opt then
               cut_opt[i] ← cut_i,j,k
               tiling_opt[i] ←tiling_i,j
         end
   end
end
return cut_opt, tiling_opt
```

BIHIWE Instruction Set

The BIHIWE Instruction Set Architecture (ISA) exposes the unique properties of the BIHIWE architecture to the software: (1) efficient mixed-signal execution using bit-partitioned MS-WAGG and capacitive accumulation, and (2) clustered architecture that takes advantage of the power efficiency of mixed-signal acceleration to scale-up the number of MS-WAGGs in BIHIWE. BIHIWE uses a block-structured ISA that segregates the execution of the DNN into (1) data communication instruction blocks that accesses tiles of data from the 3D-stacked memory and populates the on-chip scratchpads (Input Buffer/Weight Buffer/Output Buffer in FIG. 2B), and (2) compute instruction blocks each of which consumes the tile of data produced by a corresponding communication instruction block and produces an output tile. The BIHIWE compiler stack can statically assign communication and compute instruction blocks to accelerator clusters, shifting the complexity from hardware to the compiler. By splitting the data transfer and on-chip data processing into separate instructions, the BIHIWE ISA enables software pipelining between clusters and allows the memory accesses to run ahead and fetch data for the next tile while processing the current tile.

Compute Instruction Block

A block of compute instructions expresses the entire computation to produce a single tile in an accelerator core. Further, the compute block governs how the input data for a DNN layer is bit-partitioned and distributed across wide aggregators within a single core. As such, the compiler has complete control over the read/write accesses to on-chip scratchpads, A/D and D/A conversion, and execution using the MS-WAGGs and digital blocks in an accelerator core. The granularity of bit-partitioning and charge-based accumulation is determined for each microarchitectural implementation based on the technology node and circuit design paradigm. To support different technology nodes and circuit design styles and allow extensions to the architecture, the BIHIWE ISA encodes the bit-partitioning and accumulation cycles. The design space can be further explored to find the optimal design choice for each combination of technology node and circuits.

Communication Instruction Block

The key challenge when scaling up the design is to minimize data-movement while parallelizing the execution of the DNN across the on-chip compute resources. To simplify the hardware, BIHIWE instruction set captures the static schedule of data movement as a series of communication instruction blocks. Static scheduling is possible as the topology of the DNN does not change during inference and the order of layers and neurons is known statically. The BIHIWE compiler stack assigns the communication blocks to the cores according to the order of the layers. This static ordering enables BIHIWE to use a simple statically scheduled bus instead of a more complex interconnection. To maximize energy efficiency, it is imperative to exploit the high degree of data-reuse offered by DNNs. To exploit data-reuse when parallelizing computations across cores of the BIHIWE architecture, the communication instructions support broadcasting/multicasting to distribute the same data across multiple cores, minimizing off-chip memory accesses. Once a communication block writes a tile of data to the on-chip scratchpads, it can be reused over multiple compute blocks to exploit temporal data locality within a single accelerator core.

Evaluation

Methodology

Benchmarks

Eight DNN and RNN neural network models were used to evaluate BIHIWE. Table 3 shows some example evaluation results. The evaluated DNNs cover a diverse set of applicable domains including image classification, object and optical character recognition, and language modeling. This set of benchmarks includes medium to large scale model weights from 2 MBytes to 224.6 Mbytes and a wide range of number of multiply-add operations from 13 MOps to 4269 MOps. This diverse selection of network models shows the applicability of the proposed mixed-signal accelerator across various DNN and RNN models.

TABLE 3

Evaluated benchmarked DNNs

| DNN | Type | Domain | Dataset | Multiply-Adds | Model Weights |
|---|---|---|---|---|---|
| AlexHet | CNN | Image Classification | Imagenet | 2,678 MOps | 224.6 MBtypes |
| SVHN | CNN | Optical Character Recognition | SVHN | 158 MOps | 6.1 MBtypes |
| CIFAR-10 | CNN | Object Recognition | CIFAR-10 | 617 MOps | 13.4 MBtypes |
| VGG-7 | CNN | Object Recognition | Imagenet | 317 MOps | 10.8 MBtypes |

TABLE 3-continued

| Evaluated benchmarked DNNs | | | | | |
|---|---|---|---|---|---|
| DNN | Type | Domain | Dataset | Multiply-Adds | Model Weights |
| ResNet-18 | CNN | Image Classification | Imagenet | 4,269 MOps | 25.9 MBtypes |
| LeNet-5 | CNN | Optical Character Recognition | MNIST | 16 MOps | 2.0 MBtypes |
| PTB-RNN | RNN | Language Modeling | Penn k TreeBan | 17 MOps | 16 MBtypes |
| PTB-LSTM | RNN | Language Modeling | Penn TreeBank | 13 MOps | 12.3 MBtypes |

Simulation Infrastructure

A cycle-accurate simulator and a compiler have been developed for BIHIWE. The compiler takes in a caffe-2 specification of the DNN model, finds the optimum tiling and cutting for each layer, and maps it to the ISA of the BIHIWE architecture. Then, the simulator executes each of the optimized network using the BIHIWE architecture model and reports the total execution cycles and energy consumption.

TETRIS Comparison

The BIHIWE accelerator is compared with TETRIS, a state-of-the-art fully-digital 3D-stacked dataflow accelerator for DNNs. The on-chip power dissipation of BIHIWE is matched with that of TETRIS and the total runtime and total energy consumption were compared, including energy for off-chip memory accesses. The simulation takes into account the difference in frequency between BIHIWE (330 MHz) and TETRIS (500 MHz). The baseline TETRIS supports 16-bit operations and data accesses while BIHIWE supports 8-bit. For fairness, the open-source TETRIS simulator has been modified to proportionally scale its runtime and energy. BIHIWE supports 8-bit operands since this representation has virtually no impact by itself on the final accuracy of the DNNs.

GPU Comparison

To further evaluate the benefits of the proposed architecture, BIHIWE has been compared to two Nvidia GPUs (i.e., Titan Xp and Tegra X2) based on Pascal architecture. Table 4 shows the example eight DNN benchmarks for 8-bit inference on GPU using Nvidia's own TensorRT 4.0 library compiled with the optimized cuDNN 7.0 and CUDA 9.1. For each DNN benchmark, 1,000 warmup iterations are performed and the average runtime across 10,000 iterations with a batch-size of 16 is reported.

TABLE 4

| BIHIWE and baselines platforms | | | | | |
|---|---|---|---|---|---|
| Parameters | ASIC | | Parameters | GPU | |
| Chip | BIHIWE | TETRIS | Chip | Titan Xp | Tegra X2 |
| MACCs | 16,384 | 3,136 | SIMD Lanes | 3,584 | 256 |
| On-chip Memory | 9216 KB | 3698 KB | Memory | 12 GB | 8 GB |
| Chip Area | | | Chip Area(mm^2) | 471 | — |
| (mm^2) | 122.3 | 56 | Total Dissipation Power | 250 W | 7.5 W |
| Frequency | 330 Mhz | 500 Mhz | Frequency | 1531 Mhz | 875 Mhz |
| Technology | 45 nm | 45 nm | Technology | 16 nm | 16 nm |

Energy and Area Measurement

The switched-capacitor MACCs of the MS-BPMACC units has been implemented in Cadence Analog Design Environment V6.1.3 and Spectre SPICE V6.1.3 is used to model the system and extract the energy numbers.

In addition, Layout XL of Cadence simulator is used to measure the area of the switched-capacitor MACC units. For all the hardware modeling, FreePDK 45-nm standard cell library is used. The area and power numbers of ADC are scaled proportionally to match the 45 nm technology node.

All the digital blocks of the BIHIWE architecture, including adders, shifters, interconnection, and accumulators have been implemented in Verilog RTL and Synopsys Design Compiler (L-2016.03-SP5) to synthesize these blocks and measure the energy consumption and area. For on-chip SRAM buffers, CACTI-P is used to measure the energy and area of the memory blocks. The 3D-stacked DRAM architecture is based on HMC stack, the same as TETRIS.

Error Modeling

For error modeling, Spectre SPICE V6.1.3 is used to extract the noise behavior of MACC units via circuit simulations. Both thermal noise and computational error due to incomplete charge transfer (as described in Section 5) are considered. The extracted noise model from hardware, including thermal noise and the computational error non-idealities, are integrated into TensorFlow v1.5 for a re-training pass that recovers the loss in accuracy as summarized in Table 5.

TABLE 5

| Example Evaluation Results | | | | |
|---|---|---|---|---|
| DNN Model | Dataset | Top-1 Accuracy (With Ideal Circuits) | Top-1 Accuracy (With circuit non-idealities) | Top-1 Accuracy (After retraining) |
| AlexNet | ILSVRC12 | 53.1% | 50.9% | 52.2% |
| SVHN | SVHN | 97.3% | 95.2% | 97.3% |
| CIFAR-10 | CIFAR-10 | 88.1% | 10.6% | 88.1% |
| VGG-7 | ILSVRC12 | 92.5% | 37.6% | 92.0% |
| ResNet-18 | ILSVRC12 | 59.2% | 57.2% | 58.3% |
| LeNet-5 | MNIST | 99.5% | 55.3% | 99.5% |
| PTB-RNN | Penn TreeBank | 1.1 BPC | 1.6 BPC | 1.2 BPC |
| PTB-LSTM | Penn TreeBank | 97 PPW | 170 PPW | 100 PPW |

8.2 Experimental Results

Performance and Energy Comparison with TETRIS

Figure 7:
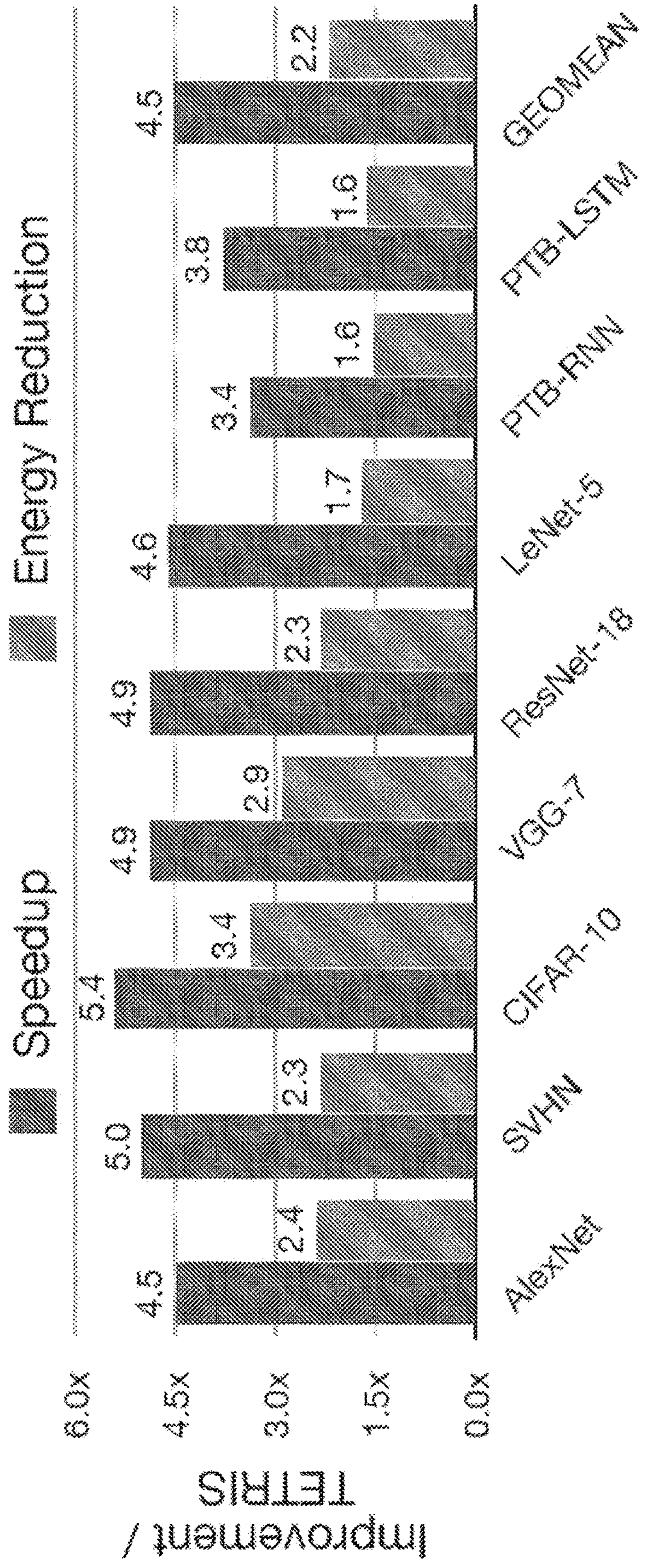
FIG. 7 shows example performance and energy reduction of the BIHIWE accelerator in accordance with one or more embodiments of the present technology.

FIG. 7 shows example performance and energy reduction of the BIHIWE accelerator over the TETRIS accelerator under the same on-chip power budget in accordance with one or more embodiments of the present technology. On average, BIHIWE delivers a 4.5 times speedup over TETRIS. This significant speedup over TETRIS is attributed to the use of wide mixed-signal MS-BPMACC units in BIHIWE as opposed to PEs in TETRIS. The wide bit-partitioned mixed-signal design of MS-BPMACC in the BIHIWE architecture enables us to cram around 5 times more compute units within the same on-chip power budget as TETRIS. The highest speedup is observed in CIFAR-10, where its network configurations enable the BIHIWE architecture to better utilize the on-chip compute resources. The lowest speedup is observed in the evaluated RNN networks, PTB-RNN and PTB-LSTM. That is because these RNN networks need to perform a large amount of matrix-vector operations which require a significant number of memory accesses, which diminishes the benefits from the mixed-signal computations.

FIG. 7 also demonstrates the total energy reduction for BIHIWE across the evaluated benchmarks as compared to TETRIS. On average, BIHIWE yields 2.2 times energy reduction over TETRIS, including energy for off-chip memory accesses, while consuming the same on-chip power as TETRIS. Similar to speedup, CIFAR-10 enjoys the highest energy reduction. That is because CIFAR-10 network topology enables better utilization of compute resources. The lowest energy reduction is observed in RNN benchmarks, PTB-RNN and PTB-LSTM since the energy consumption for these benchmarks is dominated by off-chip memory accesses. Compared to other CNN models, LeNet-5 sees a lower energy reduction from the BIHIWE architecture. That is because BIHIWE replicates the data across multiple accelerator cores to yield higher parallelism at the cost of more energy consumption.

Energy Breakdown

Figure 8:
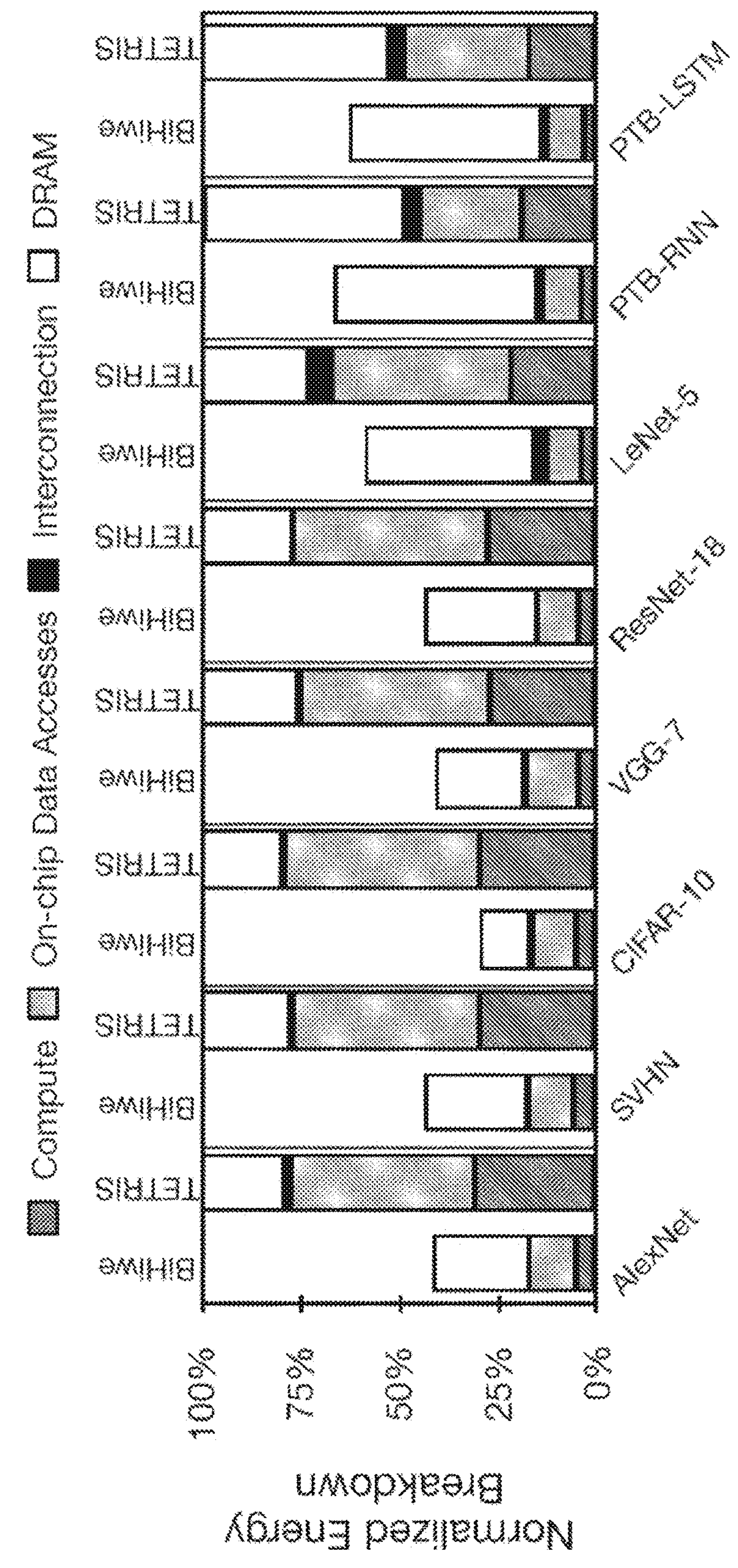
FIG. 8 shows the energy breakdown when the network models run on BIHIWE (mixed-signal accelerator) and TETRIS (fully-digital accelerator) in accordance with one or more embodiments of the present technology.

FIG. 8 shows the energy breakdown when the network models run on BIHIWE (mixed-signal accelerator) and TETRIS (fully-digital accelerator) in accordance with one or more embodiments of the present technology. The energy breakdown is normalized to the case where the network models run on TETRIS. The energy breakdown is shown across four major architectural units: (1) on-chip compute units, (2) on-chip memory (buffers and register file), (3) interconnect, and (4) off-chip DRAM. The off-chip data accesses to DRAM account for the highest portion of the total energy in BIHIWE. Since BIHIWE architecture significantly reduces the energy consumption of on-chip computations, the proportion of off-chip DRAM accesses to the total energy consumption escalates. While BIHIWE has a significantly larger number of on-chip compute resources compared to TETRIS, the number of off-chip data accesses remain largely the same. This is because the statically-scheduled bus allows data to be multicast/broadcast across multiple accelerator cores in BIHIWE without significantly increasing the number of off-chip data accesses. Furthermore, the statically-scheduled bus enables the BIHIWE compiler stack the freedom to optimize the partitioning computations across accelerator cores. Most layers in the benchmarked DNNs benefit for partitioning the different inputs in a single batch (batch size is 16) across BIHIWE cores and broadcasting weights across core, which is not explored in TETRIS. As a result, these networks have lower off-chip accesses. The breakdown of energy consumption varies with the type of computations required by the DNN as well as the degree of data-reuse. Benchmarks PTB-RNN and PTB-LSTM are recurrent neural networks that perform large matrix-vector operations and require significantly larger memory accesses for weights as opposed to the convolutional layer in the rest of the benchmarks. Therefore, PTB-RNN and PTB-LSTM use more energy for off-chip accesses compared to other benchmarks.

Unlike the fully-digital PEs in the TETRIS architecture that perform a single operation (such as multiplication or addition) in a cycle, BIHIWE uses MS-WAGG units which perform wide vectorized multiplication and accumulation. Exploiting wide vectorized operation is crucial in BIHIWE architecture to amortize the high cost of A/D conversion. As shown in Table 2, each MACC operation in BIHIWE consumes 5.4 times less energy compared with TETRIS. Also, the systolic organization of MS-WAGGs in each vault of BIHIWE architecture eliminates the need for register files unlike TETRIS and enforces data-sharing between columns and rows of the systolic array, which leads to 4.4 times reduction for on-chip data movement on average.

Comparison to GPUs

Figure 9:
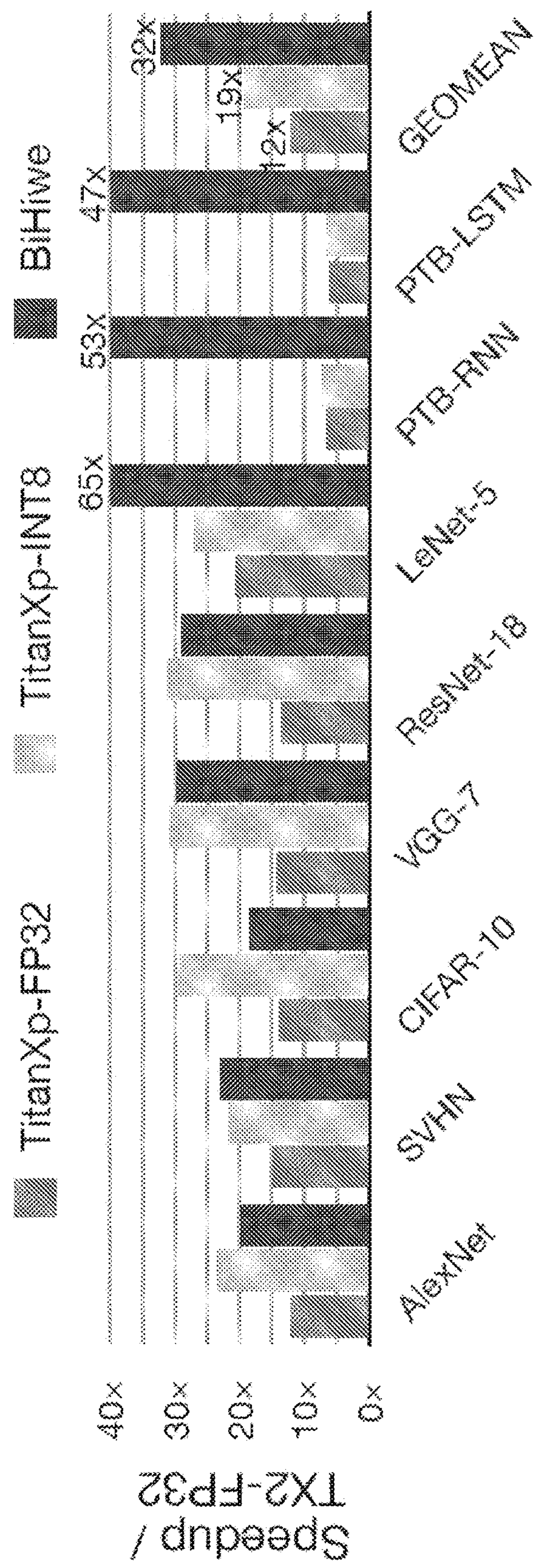
FIG. 9 illustrates an example comparison of the performance of BIHIWE and Graphics Processing Units (GPUs) in accordance with one or more embodiments of the present technology.

FIG. 9 illustrates an example comparison of the performance of Titan Xp with 32-bit floating-point operations, and Titan Xp with vectorized 8-bit operations, and BIHIWE in accordance with one or more embodiments of the present technology. The results are normalized to the Jetson TX2 platform using 32-bit floating-point operations. For the evaluations on Titan Xp, Nvidia's TensorRT is used to provide support for vectorized 8-bit operations. Performance for 32-bit floating point is reported for Jetson TX2 does not support 8-bit computations. On average, the high-performance Titan Xp performs 19.2 times faster than the low-power Jetson TX2 GPU when using vectorized 8-bit operations. The BIHIWE architecture, on average, yields 32.3 times speedup over Jetson TX2, and outperforms the high-power Titan Xp GPU with 8-bit operations by 1.7 times. The highest speedup with the BIHIWE architecture over Jetson TX2 is observed in LeNet-5, PTB-RNN, and PTB-LSTM with 64.6 times, 53.2 times, and 47.2 times, respectively. That is because the computations in PTB-RNN and PTB-LSTM are dominated by matrix-vector multiplications, which is particularly suitable for the wide vectorized operations supported in the BIHIWE architecture by MS-BP-MACC units of MS-WAGGs. The smaller parallelism offered by the LeNet-5 benchmark limits its performance on GPU and leads to a higher performance difference between BIHIWE and Titan Xp.

Sensitivity to Batch Size

Figure 10:
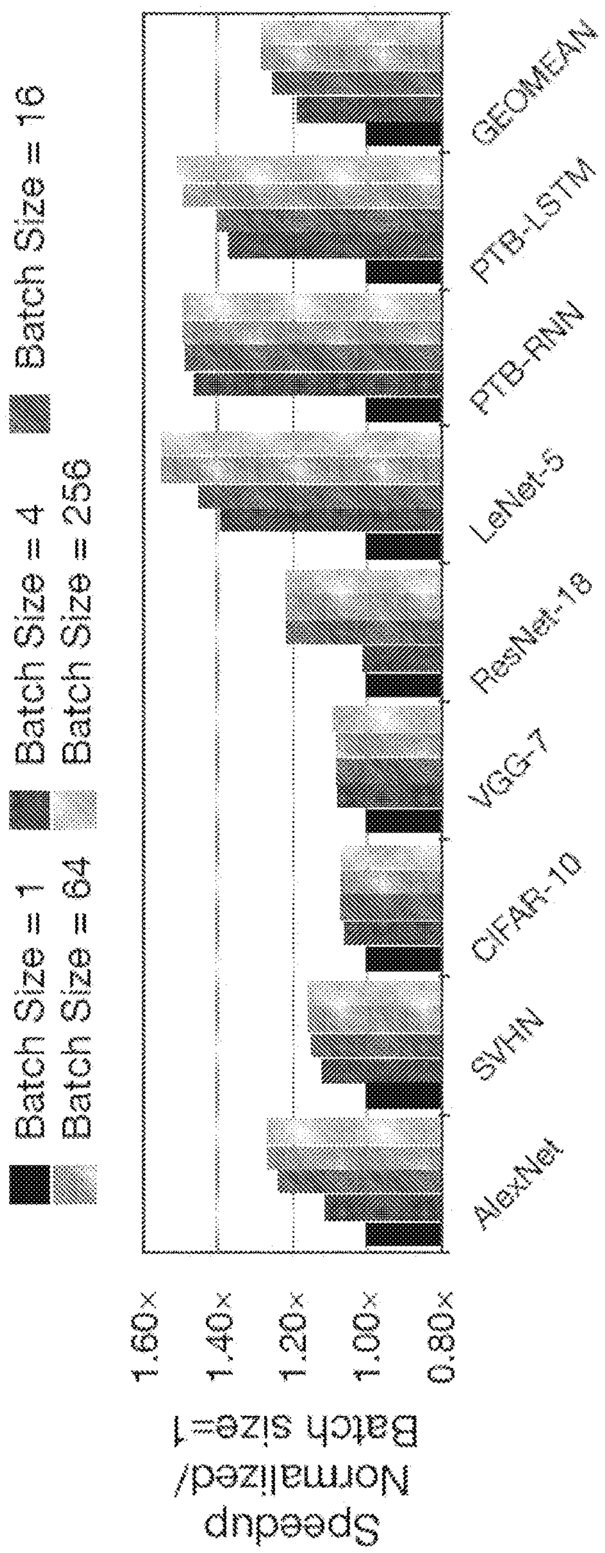
FIG. 10 illustrates an example of BIHIWE's performance sensitivity to batch size in accordance with one or more embodiments of the present technology.

FIG. 10 shows the performance of BIHIWE with batch size 1 through 256 normalized to batch size 1. The default batch size for BIHIWE is 16. On average, BIHIWE yields 1.3 times speedup with the batch size 256. The highest speedup for batch size 256 (1.5 times) is observed in benchmarks LeNet-5, PTB-RNN-2048, and PTB-LSTM-900. Increasing the batch size enables BIHIWE to utilize higher parallelism for LeNet-5. Benchmarks PTB-LSTM and PTB-RNN require a large number of accesses to weights and benefit significantly from sharing weights within a batch. For the rest of the benchmarks, the benefit of increasing parallelism and weights sharing on performance is less pronounced.

Design Space Exploration for Bit-Partitioning

Figure 11:
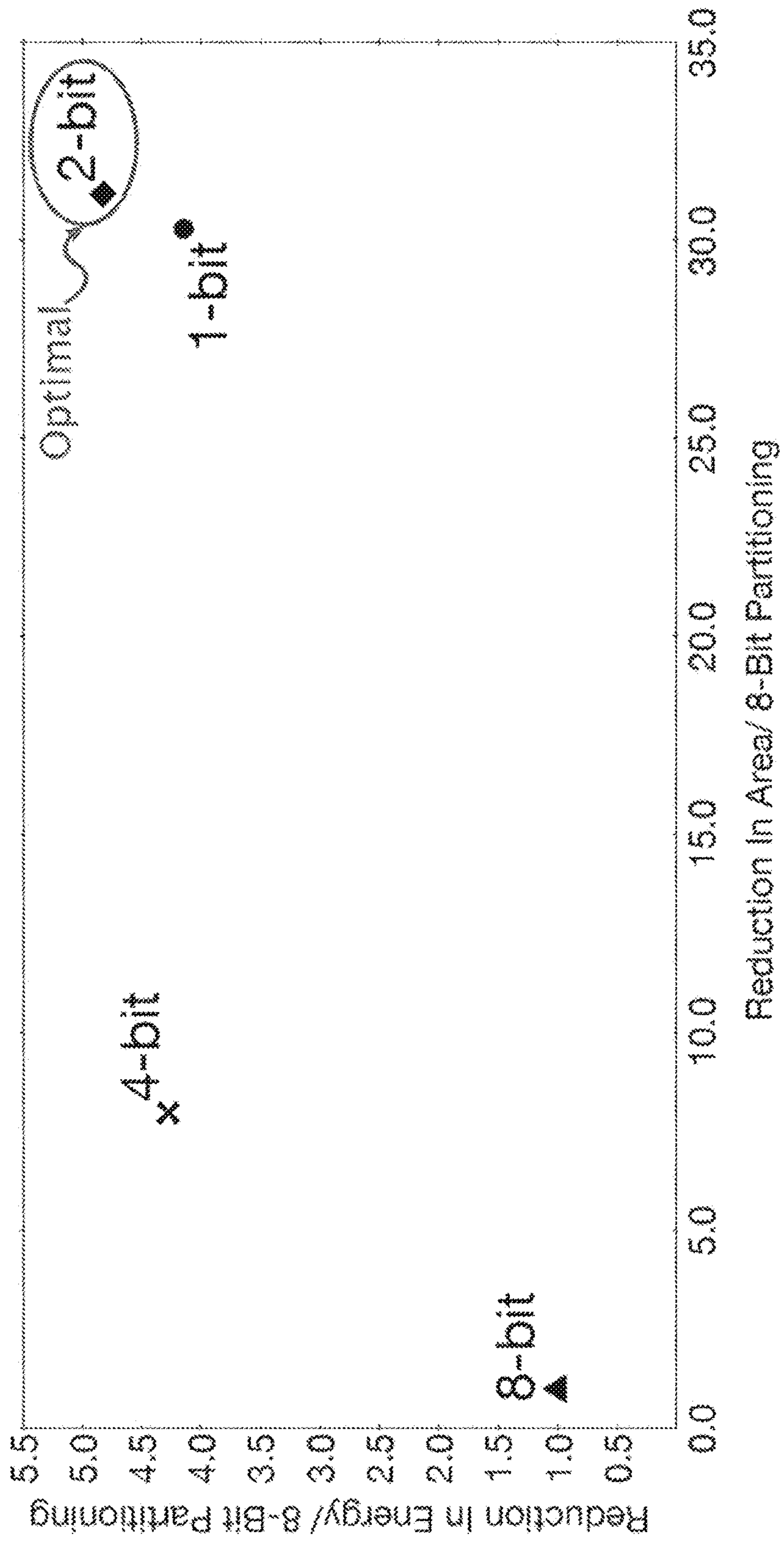
FIG. 11 illustrates an example design space exploration for bit-partitioning in accordance with one or more embodiments of the present technology.

To evaluate the effectiveness of bit-partitioning, a design space exploration with various bit-partitioned options is conducted. FIG. 11 shows the reduction in energy and area compared to an 8-bit×8-bit design when two vectors with 32 elements go under dot-product. The design simulation and measurements follow the same methodology detailed in Section 8.1. The other design points also perform 8-bit×8-bit MACC operations while utilizing our wide and interleaved bit-partitioned arithmetic. As depicted, the design with 2-bit partitioning is the most optimal choice in terms of energy and area reduction with the switched-capacitor design of MACC units at 45 nm CMOS node. The difference between 2-bit and 1-bit that single-bit partitioning quadratically increases the number of low bitwidth MACCs from 16 (2-bit partitioning) to 64 (1-bit partitioning) to support 8-bit operations. This imposes disproportionate overhead that outweighs the benefit of decreasing each MACC unit area and energy. It is noted, however, that a 4-bit partitioning can also be implemented.

Design Space Exploration for MS-BPMACC Configuration

The number of accumulation cycles (m) before the A/D conversion and the number of MACC units (n) are two main parameters of MS-BPMACC. The resolution and the sample rate of the ADC are dependent on these two parameters and determine its power consumption. FIG. 12 shows the design space exploration for different configurations of the MS-BPMACC unit. In a fixed power budget of 2W for the compute units, the total runtime and energy consumption of the BIHIWE architecture are measured for the evaluated network models. The results are normalized to the TETRIS architecture (fully-digital). As shown in FIG. 12, increasing the number of MACC units (variable n), limits the number of accumulation cycles and consequently leads to using ADCs with high sample-rate. Using high sample-rate ADCs significantly increases the power consumption and makes the design less efficient. On the other hand, increasing the number of accumulation cycles (variable m), limits the number of MACC units, which restricts the number of MS-WAGG units that can be integrated into the design under the given power budget (2W). Overall, the optimal design point that delivers the highest speedup and energy reduction is with eight MACC units (variable n) and 32 accumulation cycles (variable m).

Design Space Exploration for Clustered Architecture

Figure 13:
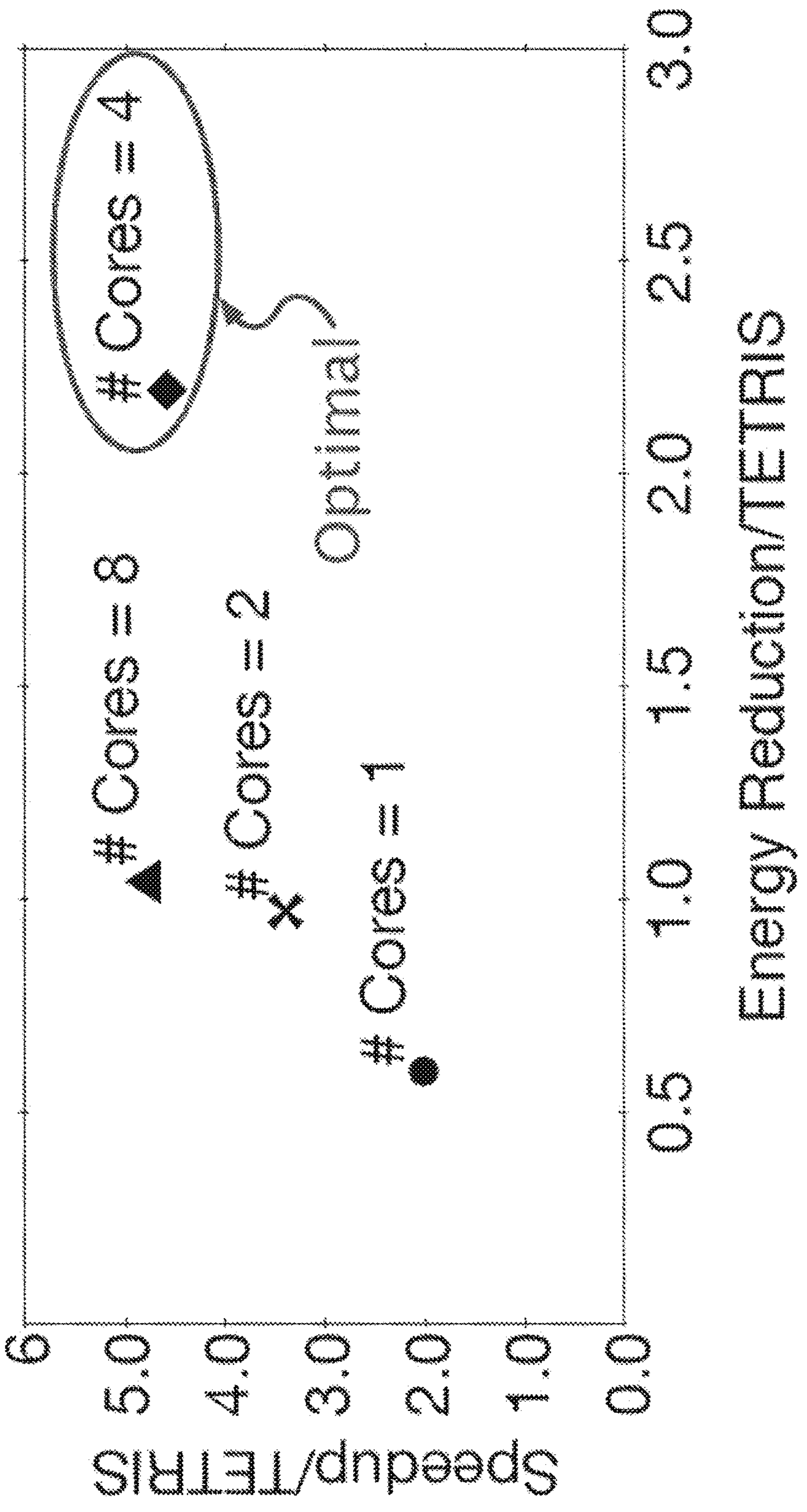
FIG. 13 illustrates an example design space exploration for different numbers of cores per cluster t in accordance with one or more embodiments of the present technology.

BIHIWE uses a hierarchical architecture with multiple accelerator cores in each vault. Having a larger number of small cores for each vault yields increased utilization of the parallel-computing resources but requires data transfer across cores. To find the optimal number of cores, the design space is explored with 1, 2, 4, and 8 core configurations. For all the configurations, the total number of MS-WAGGs allocated to each cluster is fixed to 256. As FIG. 13 shows, the BIHIWE with four number of cores per each vault (default configuration in BIHIWE) strikes the best balance between speedup and energy reduction. Performance increases as the number of cores per vault increases from 1 to 8. However, the 8-core configuration results in a higher number of data accesses. Therefore, the 4-core design point provides the optimal balance.

Evaluation of Circuitry Non-Idealities

The extracted thermal noise and computational errors from the circuit simulations are evaluated in TensorFlow. The effects of these circuit non-idealities are also evaluated on the final network for classification accuracy. Table 5 above shows the Top-1 accuracy with no circuit non-idealities, with circuit non-idealities without re-training, and with circuit non-idealities after re-training. As shown in Table 5, some of the networks, namely CIFAR-10 and LeNet-5, are more sensitive to the circuit non-idealities which leads to a higher classification accuracy degradation.

To recover from the loss in the classification accuracy due to the circuitry non-idealities, a fine-tuning step can be performed for a few epochs. Performing this fine-tuning step, the accuracy loss of the CIFAR-10, SVHN, and LeNet-5 networks is fully recovered. AlexNet and ResNet-18 are more robust of circuit non-idealities and the degradation in accuracy after retraining is below 0:9%. The final two networks, namely PTB-RNN and PTB-LSTM perform character-level and word-level language modeling, respectively. The accuracy for these two networks is measured in Bits-Per-Character (BPC) and Perplexity-per-Word (PPW), respectively. Both PTB-RNN and PTB-LSTM recover virtually all the accuracy after retraining. The results of the Top-1 accuracy after the fine-tuning step show the effectiveness of this approach in recovering the accuracy loss due to the circuitry non-idealities in analog domain.

The disclosed techniques explore wide, interleaved, and bit-partitioned arithmetic to, among other features and benefits, overcome two key challenges in mixed-signal acceleration of DNNs: limited encoding range, and costly A/D conversions. This bit-partitioned arithmetic enables rearranging the highly parallel MACC operations in modern DNNs into wide low-bitwidth computations that map efficiently to low-bitwidth mixed-signal units. Further, these units operate in charge domain using switched-capacitor circuitry and reduce the rate of A/D conversion by accumulating partial results in the analog domain. The resulting microarchitecture, named BIHIWE, offers 4.5× higher performance compared to a fully-digital state-of-the-art architecture within the same power budget. These encouraging results suggest that the combination of mathematical insights with architectural innovations can enable new avenues in DNN acceleration.

BIHIWE leverages clustering design to best utilize power-efficiency of the mixed-signal domain and 3D stacking. This accelerator receives a high-level DNN specification and maps the required computations of the workload to the hardware through its compilation stack. The computations of the DNN layers are distributed across the BIHIWE's's cores. The required data for these computations can be fetched form the DRAM dies of the 3D-stacked memory and is stored on the on-chip memory of the accelerator cores. Each core then executes the convolution and fully-connected layers in the mixed-signal domain using the wide, interleaved and bit-partitioned arithmetic. Other layers of the DNN (pooling, normalization, etc.) are processed using digital blocks. The mixed-signal vector dot-product compute units are organized in a systolic array architecture to form one accelerator core of BIHIWE. Finally, at the architecture-level, multiple accelerator cores of BIHIWE are integrated with a 3D-stacked memory subsystem in a clustered fashion.

BIHIWE can provide a domain-specific architecture which targets the domain of artificial intelligence and can be applied to accelerate applications which benefits from artificial intelligence, such as DNNs. Datacenters can be a perfect fit for this accelerator which can deliver a high throughput with minimized power consumption.

In one example aspect, an accelerator apparatus comprises a plurality of mixed-signal units (e.g., a plurality of MACCs). Each of the plurality of mixed-signal units comprises a first digital-to-analog convertor (e.g., C-DACx as shown in FIG. 3) configured to convert a subset of digital-domain bits partitioned from a first input vector (e.g., $x_i$ from input vector X as shown in FIG. 1B) to a first analog-domain signal and a second digital-to-analog convertor (e.g., C-DACw as shown in FIG. 3) configured to convert a subset of digital-domain bits partitioned from a second input vector (e.g., $w_i$ from input vector W as shown in FIG. 1B) to a second analog-domain signal. The second digital-to-analog convertor is coupled to the first digital-to-analog convertor to enable a multiplication operation on the first analog-domain signal and the second analog-domain signal. The apparatus includes a capacitor (e.g., $C_{ACC}$ as shown in FIG. 3) coupled to the first digital-to-analog convertor and the second digital-to-analog convertor configured to accumulate a result of the multiplication operation as an analog signal. The apparatus also includes a circuitry (e.g., as shown in FIG. 2A and/or FIG. 5A) coupled to the plurality of mixed-signal units to shift at least part of the analog signals of the plurality of mixed-signal units according to one or more control signals. The circuitry comprises an additional capacitor (e.g., $C_{ACC+}$ or $C_{ACC-}$) to store an analog-domain result for a multiply-accumulate operation of the first input vector and the second input vector based on accumulating results from the plurality of mixed-signal units. The apparatus also includes an analog-to-digital converter coupled to the circuitry to convert the analog-domain result into a digital-domain result.

In some embodiments, the additional capacitor of the circuitry is configured to accumulate the analog-domain result as a scalar value. In some embodiments, the apparatus further includes a register configured to store the digital-domain result from the analog-to-digital converter. In some embodiments, the subset of digital-domain bits in the first input vector and the subset of digital-domain bits in the second input vector have a length of either 2 or 4 bits. In some embodiments, of the plurality of mixed-signal units is configured to receive a control signal indicating a sign of the subset of digital-domain bits in the first input vector or a sign of the subset of digital-domain bits in the second input vector. In some embodiments, In some embodiments, In some embodiments, the first digital-to-analog convertor comprises a first capacitor and the second digital-to-analog convertor comprises a second capacitor coupled to the first capacitor (e.g., as shown in FIG. 4B). The first and second capacitors configured to perform the multiplication operation based on a ratio of a capacitor size regardless of a value of capacitance.

In some embodiments, the plurality of mixed-signal units, the circuitry, and the analog-to-digital converter form a computation unit of a plurality of computation units (e.g., MS-WAGG as shown in FIG. 2B) in an accelerator core of the apparatus. In some embodiments, the analog-to-digital converter is the only analog-to-digital converter of the computation unit. In some embodiments, the accelerator core is one of a plurality accelerator cores in a stacked configuration to form a three-dimensional (3D) array of computation units grouped into multiple clusters, such as shown in FIG. 2C). In some embodiments, the apparatus further includes a memory substrate coupled to the plurality of accelerator cores in a stacked configuration to form a 3D array of memory units. Each memory unit configured to provide on-chip data access to a corresponding accelerator core.

Figure 14:
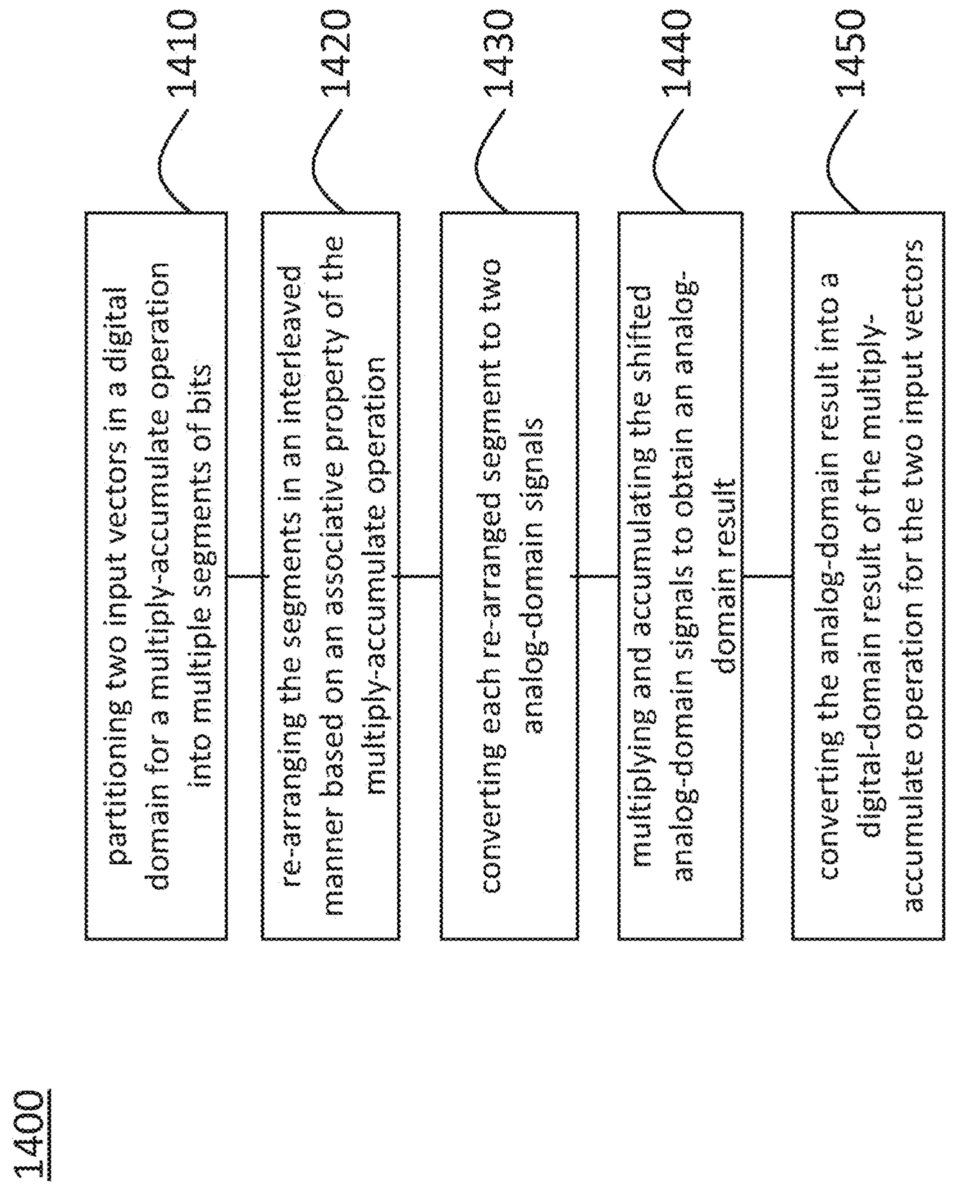
FIG. 14 is a flowchart representation of a method for performing computation on an accelerator apparatus in accordance with one or more embodiments of the present technology.

In another example aspect, a method for performing computation is disclosed. FIG. 14 is a flowchart representation of a method 1400 for performing computation on an accelerator apparatus in accordance with one or more embodiments of the present technology. The method 1400 comprises, at operation 1410, partitioning two input vectors in a digital domain for a multiply-accumulate operation into multiple segments of bits. The method 1400 comprises, at operation 1420, re-arranging the segments in an interleaved manner based on an associative property of the multiply-accumulate operation. Each re-arranged segment comprising a first subset of bits and a second subset of bits. The method 1400 comprises, at operation 1430, converting, for each re-arranged segment, the first subset of bits and the second subset of bits to two analog-domain signals. The method 1400 comprises, at operation 1440, multiplying and accumulating the analog-domain signals to obtain an analog-domain result. The method 1400 comprises, at operation 1450, converting the analog-domain result into a digital-domain result of the multiply-accumulate operation for the two input vectors.

In some embodiments, the method includes determining a sign for the first subset of bits or the second subset of bits. In some embodiments, the method includes storing the digital-domain result in a register of the accelerator apparatus. In some embodiments, each segment has a length of either 2 or 4 bits. In some embodiments, converting the analog-domain result into the digital-domain result is performed only once. In some embodiments, the accelerator apparatus comprises a plurality of accelerator cores in a stacked configuration that forms a three-dimensional (3D) array and the method also includes accessing data from a three-dimensional array of memory units. Each memory unit is coupled to a corresponding accelerator core to provide on-chip data access to the corresponding accelerator core.

In yet another aspect, a non-transitory computer readable medium having code stored thereon that is executable by a processor is disclosed. The code, when executed by a processor, causes the processor to receive a set of instructions to perform one or more multiply-accumulate operations on an apparatus that comprises a plurality of accelerator cores and a memory substrate. The plurality of accelerator cores is in a stacked configuration to form a three-dimensional (3D) array of computation units that is grouped into multiple clusters. The memory substrate is also in a stacked configuration to form a 3D array of memory units. Each memory unit is configured to provide on-chip data access to a corresponding accelerator core. The processor is configured to perform a pre-processing operation that comprises dividing the set of program code and the set of data based on a structural description of the apparatus. The structural description includes information about a manner in which the 3D array of computation units and the 3D array of memory units are structured. The processor is also configured to generate instruction blocks based on a result of the pre-processing operation.

In some embodiments, the structural description includes information about at least (1) a number of the plurality of accelerator cores of the apparatus, (2) a number of clusters in the apparatus, (3) a bitwidth to be used for the one or more multiply-accumulate operations. In some embodiments, the instruction blocks comprise computation instruction blocks that are configured to perform, for each multiply-accumulate computation, partitioning two input vectors in a digital domain for a multiply-accumulate operation into multiple segments of bits; re-arranging the segments in an interleaved manner based on an associative property of the multiply-accumulate operation, each re-arranged segment comprising a first subset of bits and a second subset of bits; converting, for each re-arranged segment, the first subset of bits and the second subset of bits to two analog-domain signals; multiplying and accumulating the analog-domain signals to obtain an analog-domain result; and converting the analog-domain result into a digital-domain result of the multiply-accumulate operation for the two input vectors. In some embodiments, the instruction blocks comprise communication instruction blocks that are configured to distribute same data across multiple accelerator cores. In some embodiments, the communication blocks are determined for the plurality of accelerator cores based on a static ordering associated with an architecture of the neural network system.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term “data processing unit” or “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms “a”, “an” and “the” are intended to include the plural forms as well, unless the context clearly indicates otherwise. Additionally, the use of “or” is intended to include “and/or”, unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. An accelerator apparatus, comprising:

a plurality of mixed-signal units, each of the plurality of mixed-signal units comprising:

a first digital-to-analog convertor configured to convert a subset of digital-domain bits partitioned from a first input vector to a first analog-domain signal;

a second digital-to-analog convertor configured to convert a subset of digital-domain bits partitioned from a second input vector to a second analog-domain signal, wherein the second digital-to-analog convertor is coupled to the first digital-to-analog convertor to enable a multiplication operation of the first analog-domain signal and the second analog-domain signal; and a capacitor coupled to the first digital-to-analog convertor and the second digital-to-analog convertor configured to accumulate a result of the multiplication operation as an analog signal;

a circuitry coupled to the plurality of mixed-signal units to shift at least part of the analog signal according to one or more control signals, wherein the circuitry comprises an additional capacitor to store an analog-domain result for a multiply-accumulate operation of the first input vector and the second input vector based on accumulating results from the plurality of mixed-signal units; and an analog-to-digital converter coupled to the circuitry to convert the analog-domain result into a digital-domain result.

2. The accelerator apparatus of claim 1, wherein the additional capacitor of the circuitry is configured to accumulate the analog-domain result as a scalar value.

3. The accelerator apparatus of claim 1, further comprising a register configured to store the digital-domain result from the analog-to-digital converter.

4. The accelerator apparatus of claim 1, wherein the subset of digital-domain bits in the first input vector and the subset of digital-domain bits in the second input vector have a length of either 2 or 4 bits.

5. The accelerator apparatus of claim 1, wherein each of the plurality of mixed-signal units is configured to receive a control signal indicating a sign of the subset of digital-domain bits in the first input vector or a sign of the subset of digital-domain bits in the second input vector.

6. The accelerator apparatus of claim 1, wherein the first digital-to-analog convertor comprises a first capacitor and the second digital-to-analog convertor comprises a second capacitor coupled to the first capacitor, the first capacitor and the second capacitor are configured to perform the multiplication operation based on a ratio of a capacitor size regardless of a value of capacitance.

7. The accelerator apparatus of claim 1, wherein the plurality of mixed-signal units, the circuitry, and the analog-to-digital converter form a computation unit of a plurality of computation units in an accelerator core of the accelerator apparatus.

8. The accelerator apparatus of claim 7, wherein the analog-to-digital converter is an only analog-to-digital converter of the computation unit.

9. The accelerator apparatus of claim 7, wherein the accelerator core is one of a plurality of accelerator cores in a stacked configuration to form a three-dimensional (3D) array of computation units grouped into multiple clusters.

10. The accelerator apparatus of claim 9, further comprising:

a memory substrate coupled to the plurality of accelerator cores in another stacked configuration to form a 3D array of memory units, each memory unit configured to provide on-chip data access to a corresponding accelerator core.

* * * * *